United States Patent
Horvath et al.

(10) Patent No.: US 8,625,469 B2
(45) Date of Patent: Jan. 7, 2014

(54) METHOD, SYSTEM AND APPARATUS FOR PARTICIPANT VERIFICATION IN A MULTI-PARTY CALL ENVIRONMENT

(75) Inventors: David Charles Horvath, Nepean (CA);
Sean MacLean Murray, Toronto (CA);
Ilya Kalnish, Woodbridge (CA)

(73) Assignee: BCE Inc., Verdun (CA)

( * ) Notice: Subject to any disclaimer, the term of this patent is extended or adjusted under 35 U.S.C. 154(b) by 710 days.

(21) Appl. No.: 12/159,438

(22) PCT Filed: Jul. 21, 2006

(86) PCT No.: PCT/CA2006/001198
§ 371 (c)(1),
(2), (4) Date: Jun. 27, 2008

(87) PCT Pub. No.: WO2008/009089
PCT Pub. Date: Jan. 24, 2008

(65) Prior Publication Data
US 2010/0226287 A1    Sep. 9, 2010

(51) Int. Cl.
*H04L 12/16*    (2006.01)

(52) U.S. Cl.
USPC .......................................................... 370/260

(58) Field of Classification Search
USPC .......................................................... 370/260
See application file for complete search history.

(56) References Cited

U.S. PATENT DOCUMENTS

| | | | |
|---|---|---|---|
| 7,006,455 B1 * | 2/2006 | Fandrianto et al. | 370/260 |
| 2002/0034289 A1 * | 3/2002 | Pershan | 379/207.02 |
| 2005/0018827 A1 * | 1/2005 | Himmel et al. | 379/202.01 |
| 2005/0141688 A1 * | 6/2005 | Wengrovitz | 379/207.02 |
| 2005/0226172 A1 * | 10/2005 | Richardson et al. | 370/260 |
| 2005/0227680 A1 * | 10/2005 | Snowden | 455/416 |
| 2006/0095575 A1 * | 5/2006 | Sureka et al. | 709/227 |
| 2006/0277282 A1 * | 12/2006 | Christensen et al. | 709/223 |

FOREIGN PATENT DOCUMENTS

EP    1 081 932 A2    7/2001

OTHER PUBLICATIONS

Cisco Systems, Inc.—PDF Reference, Cisco Meeting Place for Outlook, Rich-Media Conferencing for Microsoft Outlook, 1992-2004.

* cited by examiner

*Primary Examiner* — Minh-Trang Nguyen

(74) *Attorney, Agent, or Firm* — Sean Murray; Murray IP Consulting Inc.

(57) ABSTRACT

According to embodiments of the present invention, there are provided a method, system and apparatus for participant verification in a multi-party call environment. A method for verifying a participant in a multi-party call environment comprises receiving an indication of the user's desire to join the multi-party call. The method further comprises determining a user identifier associated with the user. The user identifier associated with the user is then compared with at least one allowed participant identifier associated with at least one allowed participant for the multi-party call; the at least one allowed participant identifier stored in association with scheduling data for the multi-party call. Responsive to the comparing rendering a positive outcome, the communication device associated with the user is caused to join the multi-party call.

56 Claims, 7 Drawing Sheets

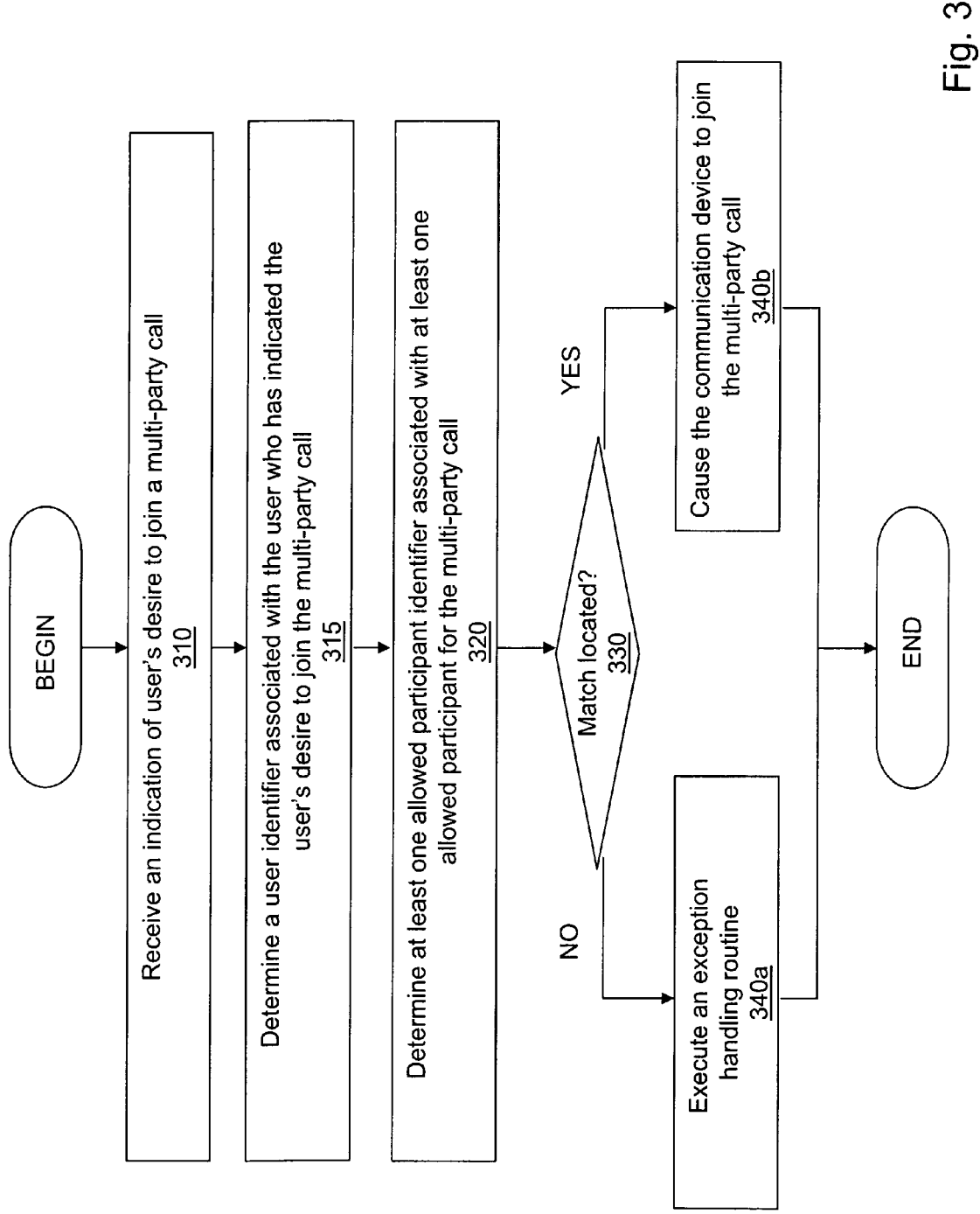

METHOD, SYSTEM AND APPARATUS FOR PARTICIPANT VERIFICATION IN A MULTI-PARTY CALL ENVIRONMENT

FIELD OF THE INVENTION

This invention relates to the field of telecommunications in general and, more specifically, to a method, system and apparatus for participant verification in a multi-party call environment.

BACKGROUND OF THE INVENTION

Communication devices, such as landline telephones, wireless communication devices and voice-over-IP telephones, offer a user an ever-increasing opportunity to stay connected no matter where the user is. With the increasing travel costs and overall pressures on businesses to control costs, more and more enterprises encourage their employees to conduct so called "virtual meetings" or, in other words, rely on telecommunication devices to conduct meetings. A "conference call" is a feature provided by telecommunication service providers or by dedicated multi-party call solutions providers that enables multiple parties to join a so-called "conference call bridge" to conduct a multi-party call. A multi-party call dial-in number (usually a local access and/or a toll free number) and a multi-party call identifier are assigned to a conference bridge. A multi-party call organizer provides the multi-party call dial-in number and the multi-party call identifier to potential multi-party call participants who are supposed to join the multi-party call. A potential multi-party call participant initiates a call using the multi-party call dial-in number and, once connected to the multi-party call provider, provides the multi-party call identifier which allows the potential multi-party call participant to be connected to the particular multi-party call.

One of the problems associated with existing multi-party call solutions is rather limited means afforded to the multi-party call organizer to control who joins the multi-party call. Some of the existing multi-party call solutions attempt to mitigate the problem by limiting the access to the conference bridge by requesting the potential participants to key in the multi-party call identifier and/or a password. Other existing multi-party call solutions announce the identity of the multi-party call participant who joins the multi-party call, which has been pre-recorded by the multi-party call participant in the process of joining the multi-party call.

Unfortunately, the existing security solutions still suffer from a number of flaws and do not adequately address the problem. For example, with the ever-increasing use of the multi-party call bridges, the multi-party call organizer distributes his or her multi-party call dial-in number and the multi-party call identifier and/or the password to a number of people at various points of time to enable them to join the multi-party call at a particular day and time. Therefore, many people can become aware of the multi-party call dial-in number, the multi-party call identifier and/or password associated with various multi-party call organizers. These multi-party call dial-in numbers and multi-party call identifiers usually do not change, and once assigned to the multi-party call organizer are generally used for years to come. Therefore, individuals with malicious intentions (i.e. those wishing to listen in on someone's multi-party call when they are actually not invited to the multi-party call), having previously legitimately learnt the conference call credentials associated with the multi-party organizer, can later on call into the multi-party call even when they are not supposed to and, thus, join a multi-party call which they are not allowed to join. Even though some multi-party call solutions announce the joining multi-party call participants, when a large number of multi-party call participants join concurrently, as is the case with larger multi-party calls, the multi-party call organizer may not be able to effectively track who has joined. Furthermore, with existing multi-party call solutions, which rely on the multi-party call participant to pre-record his or her name, the joining participants with malicious intentions may pre-record a wrong name.

SUMMARY OF THE INVENTION

According to a first broad aspect of a present invention, there is provided a method for verifying a participant in a multi-party call environment. The method comprises receiving an indication of the user's desire to join the multi-party call. The method further comprises determining a user identifier associated with the user and comparing the user identifier associated with the user with at least one allowed participant identifier associated with at least one allowed participant for the multi-party call; the at least one allowed participant identifier stored in association with scheduling data for the multi-party call. The method further comprises, responsive to the comparing rendering a positive outcome, causing a communication device associated with the user to join the multi-party call.

According to a second broad aspect of a present invention, there is provided a system for verifying a participant in a multi-party call environment. The system comprises an application server operable to receive an indication of the user's desire to join the multi-party call; determine a user identifier associated with the user and compare the user identifier associated with the user with at least one allowed participant identifier associated with at least one allowed participant for the multi-party call; the at least one allowed participant identifier stored in association with scheduling data for the multi-party call. The application server is further operable to cause a communication device associated with the user to join the multi-party call if the user identifier associated with the user matches at least one allowed participant identifier associated with at least one allowed participant for the multi-party call.

According to another broad aspect of a present invention, there is provided an apparatus for verifying a participant in a multi-party call environment. The apparatus comprises: means for receiving an indication of the user's desire to join the multi-party call; means for determining a user identifier associated with the user; means for comparing the user identifier associated with the user with at least one allowed participant identifier associated with at least one allowed participant for the multi-party call; the at least one allowed participant identifier stored in association with scheduling data for the multi-party call; and means for causing a communication device associated with the user to join the multi-party call, the means for causing being responsive to the means for comparing rendering a positive outcome.

These and other aspects and features of the present invention will now become apparent to those skilled in the art upon review of the following description of specific embodiments of the invention in conjunction with the accompanying drawings.

BRIEF DESCRIPTION OF THE DRAWINGS

Embodiments of the present invention are described with reference to the following figures, in which:

FIG. 3 depicts a flow chart of a method for participant verification in a multi-party call environment according to one non-limiting embodiment of the present invention;

It is to be expressly understood that the description and drawings are only for the purpose of illustration of certain embodiments of the invention and are an aid for understanding. They are not intended to be a definition of the limits of the invention.

DETAILED DESCRIPTION OF THE EMBODIMENTS

According to non-limiting embodiments of the present invention, there is provided a method, system and apparatus for verifying a participant in a multi-party call environment based on scheduling data. How such scheduling data is generated and maintained is immaterial for the purposes of the present invention. However, for illustration purposes a non-limiting example of how such scheduling data can be generated and maintained will now be described with reference to FIG. 1.

Figure 1:
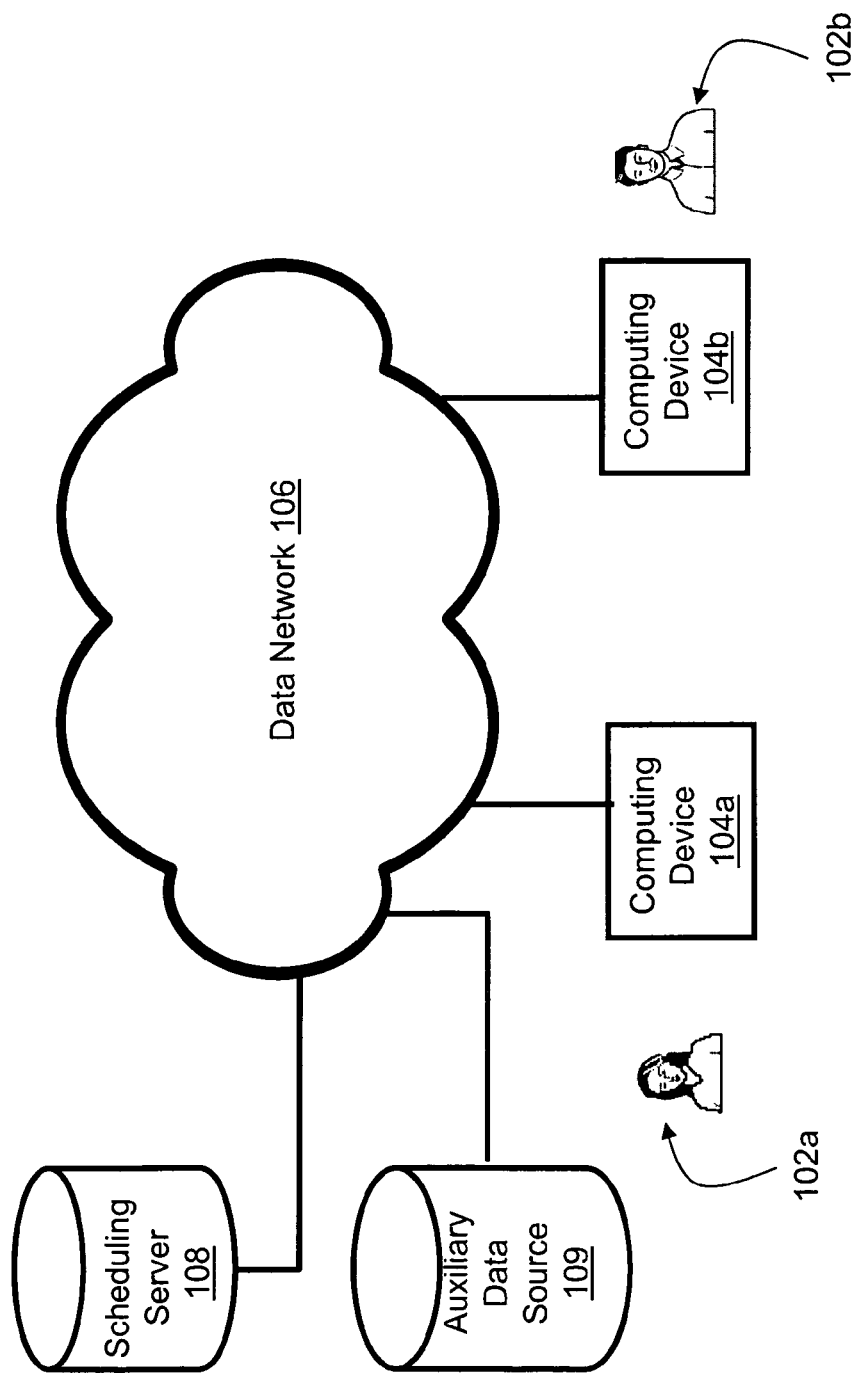
FIG. 1 is a schematic diagram representing various components of a non-limiting example of an infrastructure for generating and maintaining scheduling data.

FIG. 1 depicts a user 102a that can employ a computing device 104a to establish a communication session via a data network 106. The data network 106 can comprise a WAN, a LAN, a wireless data network, a combination thereof or any other suitable type of a data network. The computing device 104a can comprise a desktop computer, a laptop, a PDA, a wireless communication device and the like. Connected to the data network 106 can be a computing device 104b, which can be, for example, associated with a user 102b. The computing device 104b can be substantially similar to the computing device 104a.

Using the computing device 104b (or another computing apparatus), the user 102b may access a scheduling application. Examples of scheduling applications include, but are not limited to, Microsoft® Outlook®, Lotus Notes®, 30Boxes®, Google® Calendar, Apple® iCal, Schedule World®, K-Organizer®, Lovento®, Mozilla® Calendar, Mulberry®, Novell Evolution®, Kronolith®, Simple Groupware®, Web Calendar®, Windows® Calendar, Nuvvo®, Upcoming.org, AiAi® and the like. It should be noted that the type of the scheduling application is immaterial for the purposes of this invention and, thus, should not be used to limit the invention.

In the non-limiting embodiment depicted in FIG. 1, the scheduling application can access a scheduling server 108, which is coupled to the data network 106 and is accessible by the computing devices 104a, 104b via the data network 106. In these non-limiting embodiments, once the user 102b executes the scheduling application using the computing device 104b, the computing device 104b accesses the scheduling server 108 via the data network 106 and retrieves scheduling data to present via the scheduling application to the user 102b. This arrangement can be particularly useful in enterprise-based scheduling systems and web-based scheduling systems.

In another non-limiting embodiment of the present invention, the scheduling data can be maintained locally on the computing devices 104a, 104b. In yet another non-limiting embodiment, the scheduling data can be maintained locally on the computing devices 104a, 104b with a copy of the scheduling data being maintained at the scheduling server 108 or vice versa. In these non-limiting embodiments, the scheduling data maintained locally and the scheduling data maintained at the scheduling server 108 can be synchronized from time to time, as is known to those of skill in the art.

It should be noted that the scheduling application being executed on the computing device 104a can be the same as the scheduling application executed on the computing device 104b. Alternatively, the scheduling application being executed on the computing device 104a can be different from the scheduling application executed on the computing device 104b. In another non-limiting embodiment of the present invention, the computing device 104a may not execute a scheduling application or the computing device 104a can be omitted altogether. Yet in another alternative non-limiting embodiment of the present invention, the scheduling application being executed on the computing device 104a can access a different scheduling server from that accessed by the scheduling application being executed on the computing device 104b.

Using the scheduling application, the user 102b can, inter alia, schedule an appointment, send out a meeting invite, preview appointments and receive an appointment reminder. In an example to be presented herein below, it is assumed that the user 102b wishes to organize a multi-party call and, among other participants, the user 102b needs to invite the user 102a to the multi-party call to be organized. The user 102b can access his or her scheduling application and enter a scheduling event associated with a particular time and date, the scheduling event comprising scheduling data that can include, but is not limited to:

(a) time of the multi-party call;
 (b) duration of the multi-party call;
 (c) at least one multi-party call parameter, which is generally indicative as to how the potential multi-party call participants can join the multi-party call (such as, but not limited to, a multi-party call dial-in number, a multi-party call identifier, a combination of the two and the like);
 (d) a list of multi-party call participants that the user 102b would like to invite to the upcoming multi-party call.

The time of the multi-party call and the duration of the multi-party call can be entered in a manner well known in the art. In non-limiting embodiments, where the scheduling application is embodied in Microsoft Outlook, the time and duration of the multi-party call can be entered using a "Start Time" and an "End Time" fields of the new task entry form.

The at least one multi-party call parameter can be entered using one of several non-limiting approaches, including, but not limited to:

(a) entering the at least one multi-party call parameter into a dedicated field, such as the "Location" field provided in a new task entry form by Microsoft Outlook;
 (b) entering the at least one multi-party call parameter in a free-form manner into a body of the scheduling event, such as the body of the new task entry form provided by Microsoft Outlook.

It should be noted that any other suitable manner to enter the at least one multi-party call parameter can be used without departing from the teachings of this invention.

The list of multi-party call participants may be entered using one of several possible non-limiting alternatives. In one non-limiting embodiment of the present invention, the aforementioned scheduling application can present the user 102b a structured template for entering the multi-party call participant(s). In one specific non-limiting example, where the scheduling application is embodied in Microsoft Outlook, the scheduling application can present a tab entitled "Scheduling" where the user 102*b* can enter one or more multi-party call participants. The scheduling application can present a number of optional features, such as allowing the user 102*b* to select whether a particular multi-party call participant is a required or an optional participant, selecting the multi-party call participants from an address book and the like.

In some non-limiting embodiments of the present invention, the user 102*b* can use the structured template to enter an indication of a user identifier associated with the multi-party call participant, which can be, but is not limited to, a multi-party call participant's name, an e-mail address, a telephone number, an employee identifier or any other suitable type of a user identifier.

In some non-limiting embodiments of the present invention, there can be provided an auxiliary data source 109. In some embodiments of the present invention, the auxiliary data source 109 can comprise a server that maintains a corporate directory of employees associated with a particular enterprise. As is known to those of skill in the art, such a corporate directory can maintain contact data for each employee of the particular enterprise. Without limitation, the contact data may include a mailing address, and one or more termination identifiers associated with one or more communication devices at which the particular employee can be reached. The one or more termination identifiers may include an office telephone extension or direct-dial number, an alternative contact number (such as a cellular phone number, a home office number, an alternative office number, a telephone number associated with an administrative assistant and the like). The contact data may also comprise an e-mail address, a pager number, a SIP URI and the like. Naturally, the corporate directory can maintain a plethora of additional data associated with the particular employee, such as, but not limited to, a preferred salutation, an employee number, an organizational code, information about the employee's leader, information about the employee's support staff and the like.

The corporate directory can be usually accessed and searched by authorized individuals (usually by employees, but sometimes also by enterprise's clients and the like). For example, by entering a search string containing a particular user identifier (for example, a last name and a first name associated with a particular employee), all the available contact data associated with the particular employee can be retrieved from the corporate directory.

In an alternative non-limiting embodiment of the present invention, the auxiliary data source 109 can comprise an external source of contact data, such as, but not limited to, a public on-line address book, an electronic version of a telephone book (such as, but not limited to, Yellow Pages®) or any other suitable source of contact information.

In some non-limiting embodiments of the present invention, the scheduling server 108 can request contact data from the auxiliary data source 109 based on the user identifier associated with a particular multi-party participant entered by the user 102*b*. For example, the user 102*b* can enter "John Doe" to denote the fact that John Doe is a multi-party call participant who is to be invited to join the multi-party call that the user 102*b* is trying to schedule. The scheduling application can send a request to the auxiliary data source 109 via the data network 106 (which may or may not be transmitted via the scheduling server 108) in an attempt to retrieve contact data associated with this potential multi-party call participant. Provided that an entry for John Doe is maintained at the auxiliary data source 109 (in the non-limiting example described herein, provided that John Doe is an employee of an enterprise associated within the auxiliary data source 109), the auxiliary data source 109 returns to the scheduling server 108 contact data associated with John Doe.

It will be recalled that the contact data can comprise one or more termination identifiers associated with one or more communication devices that can be employed to reach a particular individual, such as, but not limited to, an office telephone number, a cellular telephone number, a home telephone number, an alternative telephone number, an IP address; as well as a number of other contact parameters that can enable a party to get in touch with John Doe (such as an e-mail address, a pager number, a URL and the like).

In some non-limiting embodiments of the present invention, the scheduling server 108 can save the contact data in association with the scheduling event. In a specific non-limiting example, the scheduling server 108 can save the contact data in XML format, such as:

```
<ParticipantName><John Doe>
  <OfficeTelephone><111-222-3333>
    <Cellular><222-333-4444>
      <Home><333-444-5555>
<AlternativeTelephone><444-555-6666>
  <E-mail><john.doe@server.com>
```

It should be noted that the scheduling server 108 can use any suitable format for storing the contact data. It should be also noted that the step of retrieving the contact data from the auxiliary data source 109 can be performed at a different stage, as will be discussed in greater detail herein below.

In alternative non-limiting embodiments of the present invention, the multi-party call participants can be entered into the scheduling application using a free-form entry option, a semi-structured entry option or using any other suitable means for entering data. In yet alternative non-limiting embodiments of the present invention, the user 102*b* may choose to manually enter one or more user identifiers (such as a telephone number, an IP address, a SIP address, a proprietary identifier, an e-mail address, an account number, an employee number, a name and the like) associated with each of the multi-party call participant.

The user 102*b* can then transmit the scheduling data associated with the multi-party call to the potential multi-party call participants, which include the user 102*a*. In a non-limiting embodiment of the present invention, using the scheduling application, the user 102*b* can send a so-called meeting invite to the multi-party call participants, which include the user 102*a*. How this meeting invite is transmitted between the scheduling application executed on the computing device 104*b* and a scheduling server or a scheduling application associated with the user 102*a* is known in the art and, as such, need not be described here in detail. Suffice it to say that transmission of the meeting invite causes the scheduling data associated with the user 102*a* to be updated with the meeting invite including: (a) time of the multi-party call; (b) duration of the multi-party call; (c) at least one multi-party call parameter, such as but not limited to a multi-party call dial-in number, a multi-party call identifier, a combination of the two and the like. It should be noted that the scheduling application executed by the computing device 104*a* can be different from the scheduling application executed by the computing device 104*b*. It should be further noted that the scheduling data associated with the user 102*a* and the user 102*b* can be maintained at different scheduling servers (not depicted). In an alternative non-limiting embodiment of the present invention, the scheduling application may not be local to the computing device 102b, but may be rather executed at a network entity, such as a server and the like.

In alternative non-limiting embodiments, the user 102b can communicate the scheduling data to the user 102a by means other then transmitting the meeting invite. For example, the user 102b can establish a voice call with the user 102a using the computing devices 104a, 104b (or any other suitable communication device) and provide the scheduling data to the user 102a via the voice call. In an alternative non-limiting implementation, the user 102b can transmit the scheduling data to the user 102a (as well as other potential multi-party call participants) by sending an e-mail containing the meeting information, by transmitting an Instant Message, by sending an SMS message and the like. In these non-limiting scenarios, the user 102a can input the scheduling data into his or her scheduling application using the computing device 104a in substantially the same manner as was described above.

Irrespective of how the user 102b generates the scheduling event and transmits the scheduling data associated with the scheduling event to the user 102a (as well as other potential multi-party call participants), the scheduling data maintained by the scheduling server 108 (or by another scheduling server) for the user 102a and for the user 102b is updated with the scheduling data associated with the scheduled multi-party call.

It should be explicitly understood that the process for generating and maintaining the scheduling data described above is presented for the purposes of an example only and should not be used to limit the invention in any way. Provided that scheduling data associated with the user 102b is maintained at the scheduling server 108 (or another memory location), it is possible to perform a method for participant validation in a multi-party call environment according to various embodiments of the present invention. It should be explicitly understood that in some embodiments of the present invention the user 102a may not even have a scheduling application and that the above scenario was provided as an example only.

Figure 2A:
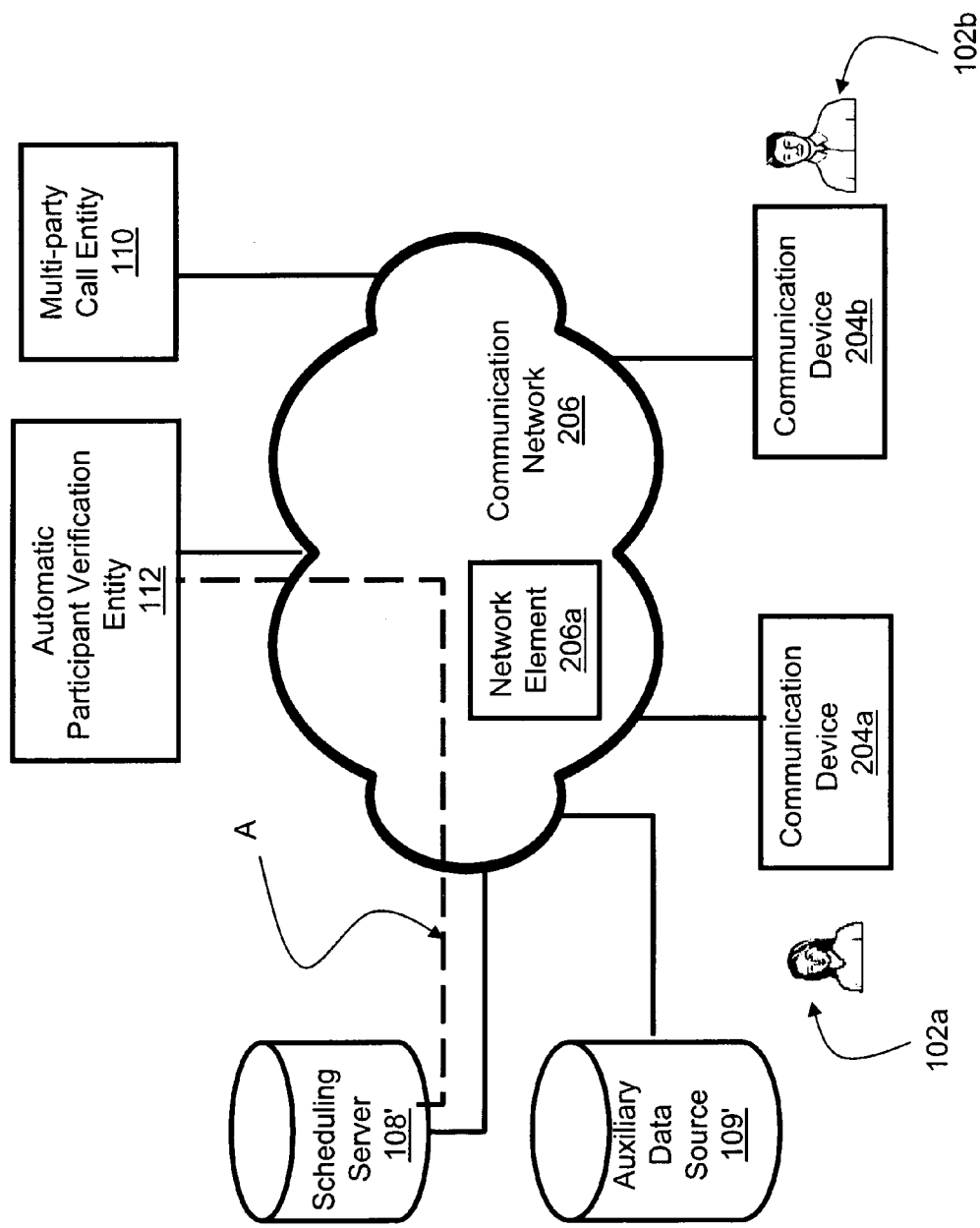
FIGS. 2A-2D depict a system for participant verification in a multi-party call environment according to various non-limiting embodiments of the present invention.

Reference is now made to FIG. 2A, which depicts a non-limiting embodiment of a system for participant validation in a multi-party call environment. In the non-limiting embodiment to be described below with reference to FIG. 2A, the user 102a employs a communication device 204a to establish a communication session via a communication network 206. In some embodiments of the present invention, the communication network 206 can comprise the above-mentioned data network 106. Alternatively, the communication network 206 can comprise the Public Switched Telecommunications Network (PSTN), a data network adapted for handling VoIP calls (such as a WAN, a LAN and the like), a wireless communication network, a Private Branch Exchange (PBX) system, a combination thereof and the like. The communication device 204a can comprise a Plain Old Telephone Service (POTS) phone, a VoIP phone, a wireless communication device, a POTS phone equipped with an Analog Telephone Adapter (ATA), a computing apparatus operable to execute a soft client for originating and maintaining a VoIP call, a PDA and the like. Naturally, the type of the communication device 204a will depend on the type of the communication network 206. For example, in a non-limiting scenario, where the communication network 206 is embodied in the data network adapted for handling VoIP calls (such as, for example, the Internet), the communication device 204a can comprise the VoIP phone, the POTS phone equipped with the ATA or the computing apparatus operable to execute a soft client for originating and maintaining a VoIP call. Alternatively, the communication device 204a can comprise a POTS phone which can connect to the communication network 206 via a gateway (not depicted). It should be noted that in some non-limiting embodiments of the present invention, the communication device 204a can comprise the aforementioned computing device 104a.

Connected to the communication network 206 can be a number of other communication devices, such as, for example, a communication device 204b, which may be associated with another user (such as the user 102b). The communication device 204b can be similar to the communication device 204a and, as such, can be embodied in a Plain Old Telephone Service (POTS) phone, a VoIP phone, a wireless communication device, a POTS phone equipped with an Analog Telephone Adapter (ATA), a computing apparatus operable to execute a soft client for originating and maintaining a VoIP call, a PDA and the like. It should be further noted that in some non-limiting embodiments of the present invention, the communication device 204b can comprise the aforementioned computing device 104b. A number of other communication devices can be connected to the communication network 206, which have been omitted from FIG. 1A for the sake of simplicity.

In some non-limiting embodiments of the present invention, the communication device 204a can be of the same type as the communication device 204b (for example, both can comprise a POTS phone or a VoIP phone). In alternative non-limiting embodiments of the present invention, the communication device 204b and the communication device 204a can be of a different type. For example, in a non-limiting embodiment of the present invention, the communication network 206 can comprise a portion of the PSTN and a portion of the data network adapted for handling VoIP calls. In this example, the communication device 204b can be a POTS phone coupled to the PSTN portion of the communication network 206, while the communication device 204a can be a VoIP phone coupled to the data network portion of the communication network 206. Naturally, in these non-limiting embodiments of the present invention, the communication network 206 can comprise a gateway (not depicted) for facilitating communication between the PSTN and the data network portions, as is well known in the art.

The communication network 206 can comprise a number of network elements, such as a network element 206a. In the above-described scenario, where the communication network 206 comprises the data network adapted for handling VoIP calls, the network element 206a can comprise what is referred to in the industry as a "packet switch" or a "soft switch", which can comprise circuitry, software and/or control logic for providing various communication services to one or both the communication devices 204a, 204b. Examples of such communication services include (i) connecting incoming calls to the communication devices 204a, 204b; and (ii) handling outgoing calls originated from the communication devices 204a, 204b.

Other examples of communication services that can be performed by the network element 206a can include, but are not limited to, call waiting, call forwarding, and so on.

In addition, in these non-limiting embodiments of the present invention, the network element 206a can comprise suitable circuitry, software and/or control logic for exchanging calls with entities outside the communication network 206, for example with entities connected to the PSTN (not depicted). A non-limiting example of the network element 106 can be embodied in a MCS 5200 Soft Switch manufactured by Nortel Networks Ltd. of 8200 Dixie Road, Brampton, Ontario L6T 5P6, Canada.

In another non-limiting scenario described above, where the communication network 206 is embodied in the PSTN, the network element 206a can comprise a switch. An example network element 206a can be embodied in a DMS100 or a DMS200 switch provided by Nortel Networks Ltd. It should be noted that any other suitable switch can be used.

It should be noted that in some non-limiting embodiments of the present invention, the communication network 206 can comprise a number of additional network elements (not depicted). For example, in some non-limiting embodiments of the present invention, the communication device 204a and the communication device 204b can be served by a respective network element.

In a non-limiting embodiment depicted in FIG. 2A, further connected to the communication network 206 can be a scheduling server 108'. The scheduling server 108' can be substantially similar to the scheduling server 108 described above. Further connected to the communication network 206, can be an auxiliary data source 109', which can be substantially similar to the aforementioned auxiliary data source 109. The communication devices 204a, 204b can be connectable to the scheduling server 108' to retrieve scheduling data to present to the users 102a, 102b via the respective scheduling application.

Within FIG. 2A, there is further provided a multi-party call entity 110 connected to the communication network 206. The purpose of the multi-party call entity 110 is to provide multi-party call services to potential multi-party call participants, such as the user 102a and the user 102b. The multi-party call entity 110 can be managed by the same service provider that manages the communication network 206 or, alternatively, by a separate entity. The multi-party call entity 110 comprises the necessary devices, switches, memory and processors to create, assign and maintain multi-party calls. An example of a multi-party call entity 110 is provided and managed by Bell Conferencing Inc. of 10 Four Seasons East, 10th Floor, Etobicoke, ON, Canada. In an alternative non-limiting embodiment of the present solution, the functionality of the multi-party call entity 110 can be integrated with the network element 206a. In alternative non-limiting embodiments of the present invention, the functionality of the multi-party call entity 110 can be incorporated in any other entity coupled to the communication network 206, for example the communication device 204a, the communication device 204b, the scheduling server 108' and the like.

In some non-limiting embodiments of the present invention, the multi-party call entity 110 is operable to deliver "meet me" type of multi-party calls, where potential multi-party call participants are issued with the multi-party call dial-in number and/or the multi-party call identifier. The multi-party call entity 110 can further be operable to deliver so-called host originated multi-party calls, where the multi-party call entity 110 is operable to establish a communication session with each of the required participants at a pre-determined telephone number. The multi-party call entity 110 can further be operable to deliver multi-media multi-party calls, which may include one or more of a voice portion, a video portion, a data portion and the like.

Also connected to the communication network 206 can be an automatic participant verification entity 112. The automatic participant verification entity 112 can be managed by the same service provider that manages the multi-party call entity 110; the same service provider that manages the communication network 206 or by another entity. In the specific non-limiting embodiment of FIG. 2A, the automatic participant verification entity 112 can be reached via the communication network 206 at a network address. The network address can be embodied in an IP address, a telephone number, a SIP address, a proprietary network identifier and the like.

Among other functions, the automatic participant verification entity 112 can perform one or more of the following functions: analyze signalling information (such as SS7 signalling information, SIP signalling information and the like), obtain Calling Line Identification (CLID) information, initiate outgoing calls, detect and interpret DTMF signals, capture speech utterances, apply speech recognition routines, determine a voice pattern associated with a particular speech utterance and the like. In some embodiments of the present invention, the automatic participant verification entity 112 can comprise an application server. An example automatic participant verification entity 112 can be embodied as a Ubiquity Application Server, which can be provided by Ubiquity of 515 Legget Drive, Suite 400, Ottawa, ON, Canada. It should be understood that any other suitable server comprising suitable processing logic can be employed for the purposes of the embodiments of the present invention, and that as one skilled in the art will appreciate, the processing logic may depend on the type of signalling information used by the communications network 106 and the type of processing required.

In the non-limiting embodiment of the present invention depicted in FIG. 2A, the automatic participant verification entity 112 can be operable to establish a connection with the scheduling server 108' via the communication network 206. This connection is depicted as "A" in FIG. 2A. The scheduling server 108' and the automatic participant verification entity 112 may implement a protocol for exchanging data, including scheduling data. An example of such protocol is "iCalendar" protocol, sometimes referred to by those of skill in the art as "iCal". This protocol is promulgated by the Internet Engineering Task Force Calendaring and Scheduling Working Group and is available from http://tools.ietf.org/html/2445. Using this protocol, the automatic participant verification entity 112 can interrogate the scheduling server 108' and, responsive to such interrogation, the scheduling server 108' can transmit to the automatic participant verification entity 112 scheduling data associated with a particular user whose details are included into the interrogation message. Other communication protocols, such as, but not limited to XML, HTML, SOAP, RMI, CORBA, MAPI, WebDAV, CDO and the like can be used.

It should be noted that the auxiliary data source 109' can be connected to the automatic participant verification entity 112 in substantially the same manner as the scheduling server 108' is connected to the automatic participant verification entity 112. Alternatively, in some embodiments of the present invention, the auxiliary data source 109' could be integrated with the automatic participant verification entity 112, the scheduling server 108', the multi-party call entity 110 or an application executed on one of the communication devices 204a, 204b.

It should be further noted that in some non-limiting embodiments of the present invention, the scheduling server 108' can be operable to exchange data with the auxiliary data source 109' either via the communication network 206, via another communication network (not depicted) or via a dedicated connection (not depicted). In a specific non-limiting example, the communication between the scheduling server 108' and the auxiliary data source 109' can be implemented in accordance with the "iCal" protocol, but any other suitable communication protocol can be used. This non-limiting architecture can be useful in a scenario, where the scheduling server 108' can access the auxiliary data source 109' (which in these non-limiting embodiments can be implemented in a corporate directory) to search and retrieve contact data associated with a particular individual whose user identifier appears within a specific scheduling event.

In some non-limiting embodiments of the present invention, the communication network 206 can comprise a portion of the PSTN and a portion of the data network adapted for handling VoIP calls. In this specific non-limiting example, the multi-party call entity 110 can be coupled, for example, to the PSTN portion; while the automatic participant verification entity 112 can be coupled, for example, to the data network portion. In an alternative non-limiting embodiment, both the multi-party call entity 110 and the automatic participant verification entity 112 can be coupled to the PST portion or to the data network portion.

It must be understood that the architecture presented with reference to FIG. 2A can be changed without departing from the teachings of the embodiments of the present invention and, as such, several components of the architecture of FIG. 2A can be modified, substituted or omitted.

Figure 2B:
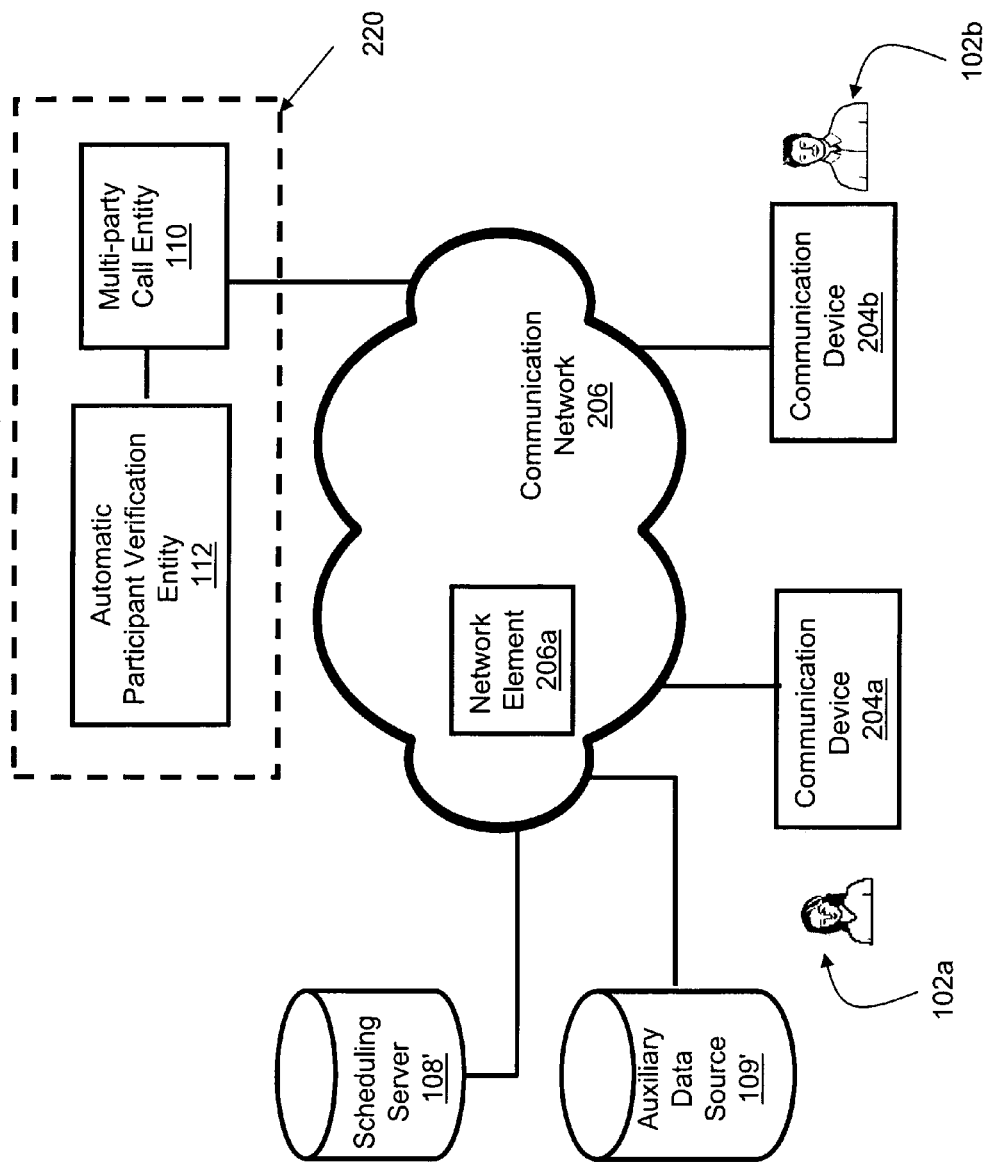

FIG. 2B depicts a system for participant verification in a multi-party call environment according to another non-limiting embodiment of the present invention. The architecture depicted in FIG. 2B is substantially similar to the architecture depicted in FIG. 2A and, as such, like elements are depicted with like numerals. In the non-limiting embodiment depicted in FIG. 2B, the multi-party call entity 110 can be coupled to the communication network 206. In some non-limiting embodiments of the present invention, the automatic participant verification entity 112 can be connected to the multi-party call entity 110 via a separate connection, such as a local area data network, a wide area data network, an Ethernet connection or any other suitable type of connection. In an alternative non-limiting embodiment of the present invention, the automatic participant verification entity 112 and the multi-party call entity 110 can be embodied in a single apparatus, depicted at 220 in FIG. 2B.

Figure 2C:
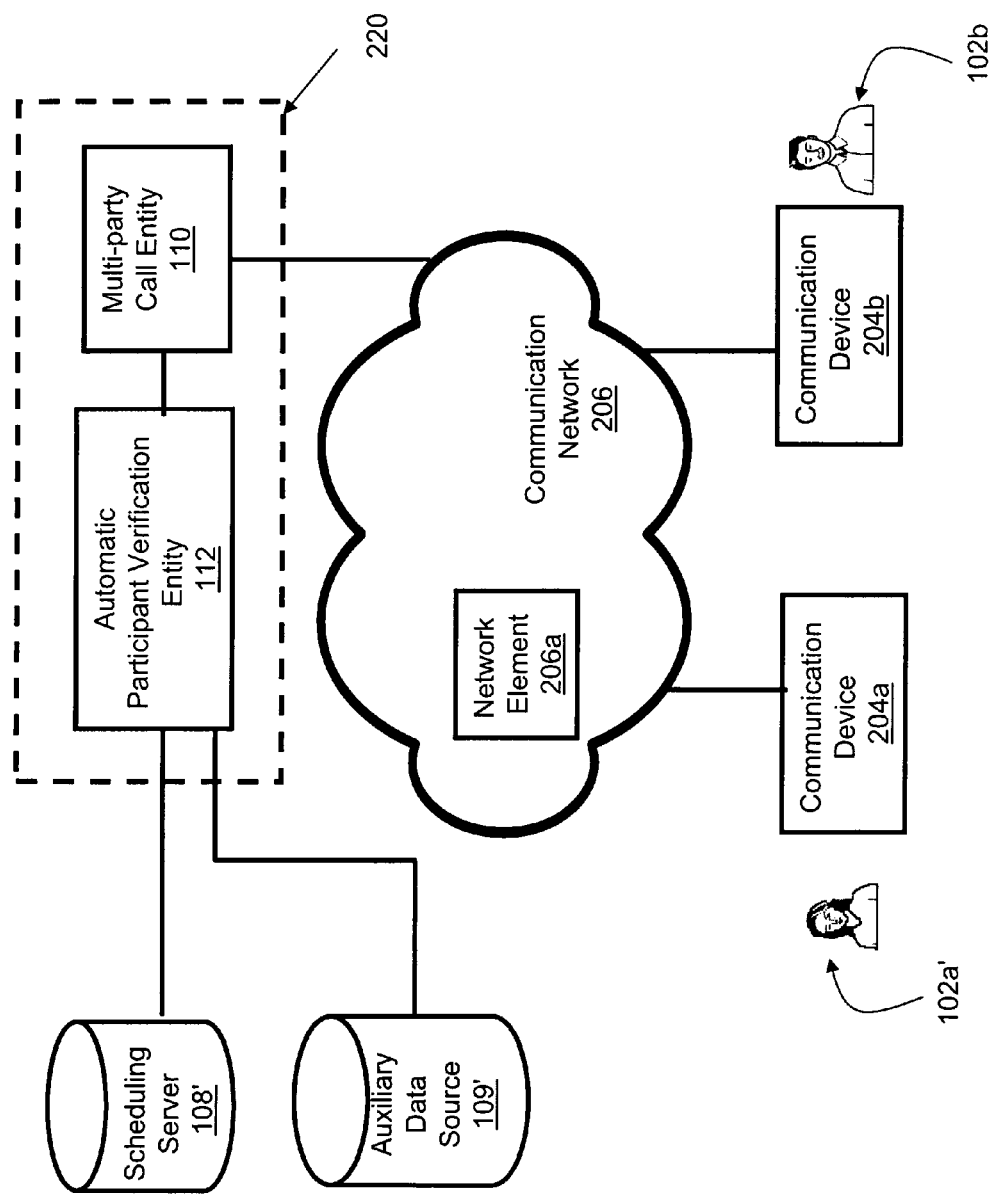

FIG. 2C depicts yet another non-limiting embodiment of the system for participant verification in a multi-party call environment. In the non-limiting embodiment depicted in FIG. 2C, the multi-party call entity 110 is coupled to the communication network 206. The automatic participant verification entity 112 can communicate with the multi-party call entity 110 via a separate connection, which can include an Ethernet connection, a local area data network, a wide area data network, a wireless network and the like. In an alternative non-limiting embodiment of the present invention, the automatic participant verification entity 112 and the multi-party call entity 110 can be embodied in a single apparatus, depicted at 220 in FIG. 2C. In some embodiments of the present invention, the automatic participant verification entity 112 can be coupled to the scheduling server 108' via a separate connection, which can include an Ethernet connection, a local area data network, a wide area data network, a wireless network and the like. In some embodiments of the present invention, the automatic participant verification entity 112 can be coupled to the auxiliary data source 109' via a separate connection, which can include an Ethernet connection, a local area data network, a wide area data network, a wireless network and the like.

Figure 2D:
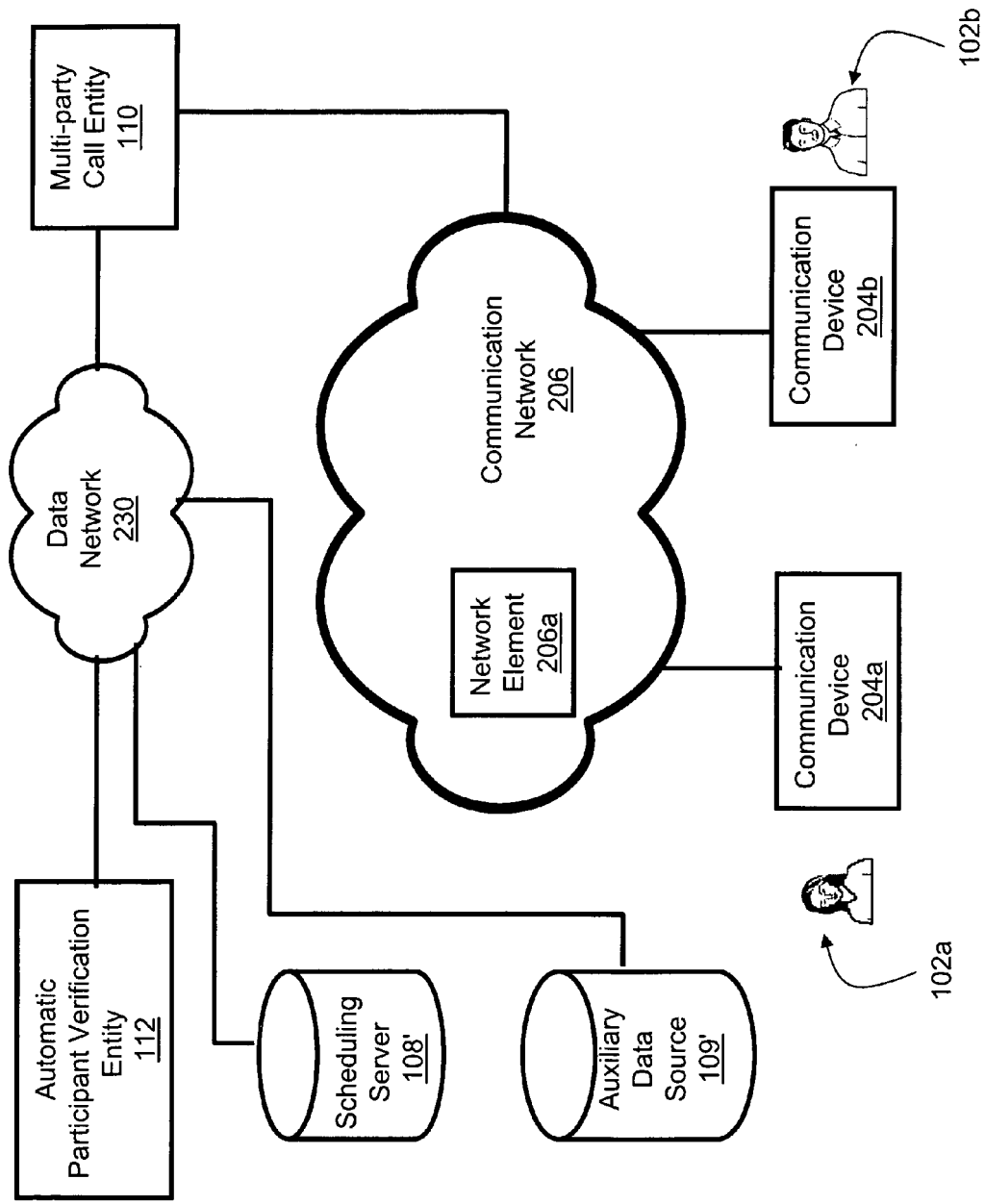

FIG. 2D depicts yet another non-limiting embodiment of a system for participant verification in a multi-party call environment. In the non-limiting embodiment depicted in FIG. 2D, the multi-party call entity 110 is coupled to the communication network 206. The multi-party call entity 110 can also be coupled to a data network 230, which can comprise a LAN, a WAN or any other suitable type of a data network. In some embodiments of the present invention, the data network 230 is separate from the communication network 206. In alternative embodiments, the communication network 206 can comprise a portion of the data network 230 and vice versa.

The data network 230 can also be coupled to the automatic participant verification entity 112, the scheduling server 108' and the auxiliary data source 109'. As such, the multi-party call entity 110 can establish a communication session with an endpoint via the communication network 206 (such as, for example, the communication device 204a), as well as with the automatic participant verification entity 112 and/or the scheduling server 108' and/or the auxiliary data source 109' via the data network 230. The automatic participant verification entity 112 can communicate with the scheduling server 108' and/or the auxiliary data source 109' via the data network 230.

It should be noted that further alternatives to those depicted with reference to FIGS. 2A-2D are possible. In an alternative non-limiting embodiment of the present invention, the functionality of the automatic participant verification entity 112 and the multi-party call entity 110 can be integrated into a single entity. In another non-limiting embodiment of the present invention, the functionality of the scheduling server 108' can be integrated with the functionality of the automatic participant verification entity 112 into a single entity. In yet another non-limiting embodiment of the present invention, the functionality of the scheduling server 108', the functionality of the automatic participant verification entity 112 and the functionality of the multi-party call entity 110 can be integrated into a single entity. It should be also noted that the functionality of one or more of the scheduling server 108', the automatic participant verification entity 112 and the multi-party call entity 110 can be integrated into the communication devices 204a, 204b; the aforementioned computing devices 104a, 104b or any other entity connected to the communication network 206. In a similar manner, the functionality of the scheduling server 108' and the auxiliary data source 109' can be integrated into a single entity. In alternative non-limiting embodiments of the present invention, the functionality of the auxiliary data source 109' can be integrated with other entities, such as, but not limited to, the automatic participant verification entity 112, the multi-party call entity 110 and the like. Yet further non-limiting alternatives are possible.

Given the architecture of FIGS. 2A-2D, it is possible to implement a method for automatic participant verification according to non-limiting embodiments of the present invention. Reference is now made to FIG. 3, which depicts a method for automatic participant verification according to one specific non-limiting embodiment of the present invention.

The method can be conveniently executed at the automatic participant verification entity 112. For the purposes of the forthcoming discussion, it is useful to make certain assumptions that will be used for illustration purposes throughout the description to be presented herein below. The user 102b has scheduled a multi-party call and, as part of the scheduling event associated with the multi-party call, the user 102b has provided user identifiers associated with all allowed multi-party call participants, including the user 102a. It is further assumed that the user 102a is now desirous of initiating an outgoing call to join the multi-party call using the communication device 204a.

Step 310

The method begins at step 310, where an indication of user's desire to join a multi-party call is received. The user 102a can provide the indication of user's desire to join the multi-party call using the communication device 204a. Several alternative non-limiting embodiments are contemplated:

Multi-Party Call Originated Via an Organizer's Telephone Number:

In a first non-limiting scenario, the user 102a can provide the indication of the user's desire to join the multi-party call by dialling a termination identifier (ex. telephone number, IP address, SIP address, etc.) associated with the multi-party call organizer For the purposes of this non-limiting embodiment of the present invention, it would be useful to return once again to the description of the functionality of the aforementioned network element 206a. Irrespective of the type of the network element 206a deployed, the network element 206a can comprise suitable circuitry and memory to maintain a mapping associated with each particular termination endpoint (such as communication devices 204a, 204b) which the network element 206a serves. An example non-limiting embodiment of such a mapping will now be described with reference to FIG. 4.

Figure 4:
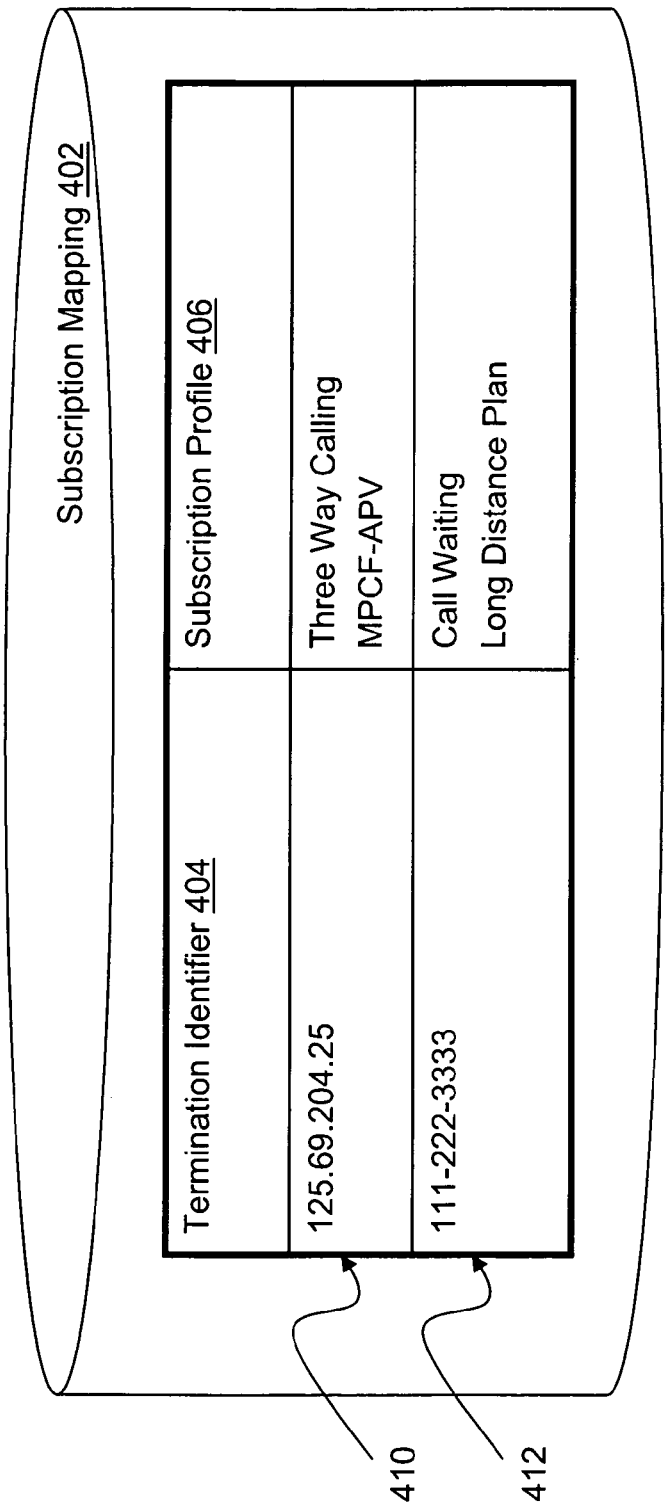
FIG. 4 is a schematic diagram representing a non-limiting embodiment of a subscription mapping maintained by a network element of FIGS. 2A-2D.

FIG. 4 denotes a specific non-limiting embodiment of a subscription mapping 402 that can be maintained by the aforementioned network element 206a (or another network element servicing the destination party, i.e. the communication device 204b). The subscription mapping 402 can comprise a number of records, such as records 410 and 412. Each of the maintained records denotes a relationship between a termination identifier 404 and a subscription profile 406. The purpose of the termination identifier 404 is to identify which termination endpoint (such as the communication devices 204a, 204b) the respective record is associated with. Some non-limiting examples of the termination identifier 404 can include a telephone number, a SIP address, a MAC address, an IP address and the like.

The purpose of the subscription profile 406 is to denote what services the user at the particular termination endpoint subscribes to. Some examples of flags maintained within the subscription profile 406 can include "Call Waiting", "Long Distance Plan", "Three Way Calling", "Voice Mail" and the like. In accordance with teaching of embodiments of the present invention, the subscription profile 406 can also maintain a flag, such as "MPCF-APV", to denote that the user of a particular termination endpoint subscribes to the multi-party call forward and automatic participant verification function contemplated herein. It should be explicitly noted that the specific examples provided for the termination identifier 404 and the subscription profile 406 are meant as examples only and should not be used to limit the present invention. Any other suitable identifiers and flags can be used.

It should be also noted that in an alternative embodiments of the present invention, the "MPCF-APV" flag is set "on-demand" by the user 102b, for example by keying in a pre-determined sequence of keys on the communication device 204B when the user 102b is desirous of activating the features contemplated herein. Alternatively, the "MPCF-APV" flag can be set by the network element 206a based on occurrence of a pre-determined event, such as, for example, the user 102b dialling a telephone number associated with the multi-party call entity 110 or, in other words, the user 102b (i.e. the multi-party call organizer) attempting to join a multi-party call.

To illustrate, a record 410 can be maintained for the termination endpoint associated with the communication device 204b and the user 102b. The termination endpoint can be assigned an IP address "125.69.204.25" which is recorded within the termination identifier 404 field. The subscription profile 406 within the record 410 comprises two flags: "Three Way Calling" and "MPCF-APV", denoting that the user 102b subscribes to a three way calling service and the multi-party call routing and automatic participant verification function contemplated herein.

A record 412 can be maintained for the termination endpoint associated with the communication device 204a and the user 102a. The termination endpoint can be assigned a telephone number "111-222-3333" which is recorded within the termination identifier 404 field. The subscription profile 406 within the record 412 comprises two flags: "Call Waiting" and "Long Distance Plan", denoting that the user 102a subscribes to a call waiting service and a long distance plan.

It should be noted that the subscription mapping 402 can maintain a number of other records associated with other potential termination endpoints, which have been omitted from FIG. 4 for the sake of simplicity. It should be further noted that the subscription profile for each record (such as records 410, 412) can maintain a number of other flags.

Returning to the description of step 310 of FIG. 3, when the user 102a originates an outgoing call destined to the communication device 102b, which in this non-limiting example is associated with the multi-party call organizer (i.e. the user 102b), the outgoing call (or to be more precise, the signalling information for setting up the outgoing call) is first received at the network element 206a. The network element 206a examines the signalling information and determines the termination identifier associated with the destination party's communication device. In the specific non-limiting example being presented herein, the network element 206a can examine the SIP invite message in order to retrieve the IP address associated with the communication device 204b.

The network element 206a then accesses the aforementioned subscription mapping 402 and retrieves a record associated with the communication device 204b, for example based on comparing the retrieved termination identifier with data stored within the termination identifier 404 field of the subscription mapping 402. Having determined that the termination identifier 404 field of the record 410 contains data that matches the retrieved termination identifier, the network element 206a examines the content of the record 410 associated with the communication device 204b. Specifically, the network element 206a retrieves the content of the subscription profile 406 and, based on the aforementioned "MPCF-APV" flag described above, determines that the user 102b is a subscriber to the multi-party call forwarding and automated participant verification function contemplated herein.

The record 410 can maintain an identifier associated with the automatic participant verification entity 112. The network element 206a retrieves such an identifier and establishes a communication session between the communication device 204a and the automatic participant verification entity 112 using the retrieved identifier of the automatic participant verification entity 112. More specifically, in the above-described scenario, where the network element 206a is embodied in a soft switch, the "MPCF-APV" flag (or any other appropriate trigger used instead) can trigger the network element 206a to apply a Simultaneous Ringing or Sequential Ringing functionality to connect the communication device 204a to the automatic participant validation entity 112. In the above-described scenario, where the network element 206a is embodied in a switch, the "MPCF-APV" flag (or any other appropriate trigger used instead) can trigger the network element 206a to apply a "follow-me-find-me" functionality to connect the communication device 204a to the automatic participant validation entity 112. It should be expressly noted that any other suitable call connection functionality to trigger the connection between the communication device 204a and the automatic participant validation entity 112 can be used by the network element 206a.

In an alternative non-limiting embodiment of the present invention, the "MPCF-APV" flag can trigger a connection between the communication device 204a and the multi-party call entity 110. The multi-party call entity 110 can in turn either forward the call to the automatic participant verification entity 112 or, alternatively, transmit a query to the automatic participant verification entity 112 to perform participant verification function contemplated herein. In the second case, the multi-party call entity 110 may put the call from the communication device 204a on hold.

Effectively, the automatic participant verification entity 112 has "intercepted" the outgoing call originated by the communication device 204a destined to the communication device 204b.

It should be noted that in case that the network element 206a fails to retrieve an appropriate flag indicative of the fact that the destination party is a subscriber to the automated participant verification function contemplated herein, the network element 106 may execute an exception handling routine, such as, but not limited to, handling the outgoing call in a standard manner, i.e. connecting the communication device 204a to the communication device 204b.

Multi-Party Call Originated Via a Multi-Party Call Dial-in Number:

In a second non-limiting scenario, the user 102a may provide the indication of the user's desire to join the multi-party call by dialling the multi-party call dial-in number using the communication device 204a. In one specific non-limiting example, the multi-party call dial-in number can be associated with the automatic participant verification entity 112. Therefore, when the network element 206a receives signalling information associated with the outgoing call being established from the communication device 204a destined to the multi-party call dial-in number, the network element 206a can be operable to route the outgoing call to the automatic participant validation entity 112. In an alternative non-limiting example, the multi-party dial-in number can actually be associated with the multi-party call entity 110. In these embodiments, the multi-party call entity 110 can first query the automatic participant verification entity 112, for example by forwarding the call to the automatic participant verification entity 112. Alternatively, rather then forwarding the call to the automatic participant verification entity 112, the multi-party call entity 110 can put the call from the communication device 204a on hold and communicate directly with the automatic participant verification entity 112 to perform the automatic participant validation function contemplated herein.

In yet alternative non-limiting embodiments of the present invention, the indication of the user's desire to join the multi-party call can be transmitted in an SMS message, transmitted in an e-mail, indicated by selecting a link on a web page or in an e-mail, indicated by clicking a button on a web page or in an e-mail, indicated by clicking a button presented by a scheduling application, indicated by dialling a short code, indicated by transmitting a message using an instant message application and the like. In these non-limiting embodiments, a trigger signal can be received by the automatic participant verification entity 112 in response to the user indicating the user's desire to join the multi-party call.

Irrespective of how the indication of the user's desire to join the multi-party call is manifested, the automatic participant verification entity 112 can receive an indication of which multi-party call the user 102a wishes to join. In some non-limiting embodiments of the present invention, the indication of the multi-party call that the user 102a wishes to join can comprise a termination identifier associated with the multi-party call organizer (ex. in the specific example being presented herein, a termination identifier associated with the communication device 204b). It will be recalled that the indication of the termination identifier can be captured by examining signalling information associated with an incoming call generated from the communication device 204b or using another one of various alternatives described in detail herein above. In an alternative non-limiting embodiment of the present invention, the indication of the multi-party call that the user 102a wishes to join can comprise the multi-party call identifier, which the user 102a can key in using the communication device 204a. Alternatively, the user 102a may produce a speech utterance representative of the multi-party call identifier. In yet an alternative non-limiting embodiment of the present invention, the multi-party call dial-in number can uniquely identify a particular multi-party call and, as such, this multi-party call dial-in number can be used as the indication of the multi-party call that the user 102a wishes to join.

Step 315:

As part of step 315, the automatic participant verification entity 112 determines a user identifier associated with the user that has indicated the user's desire to join the multi-party call (i.e. the user 102a).

In some non-limiting embodiments of the present invention, the user identifier associated with the user 102a can comprise a termination identifier associated with the communication device employed by the user 102a to establish the call (i.e. the communication device 204a). In these non-limiting embodiments of the present invention, the automatic participant verification entity 112 examines the signalling information that has been used for establishing the call between the communication device 204a and the automatic participant verification entity 112 (such as SS7 signalling information, SIP signalling information and the like). By examining the signalling information, the automatic participant verification entity 112 can retrieve CLID information or another suitable indication of the termination identifier associated with the communication device 204a.

In the above-mentioned scenario, where the communication network 206 is embodied in the data network adapted for handling VoIP calls, the automatic participant verification engine 112 can examine the received SIP invite message in order to retrieve the telephone number or the IP address associated with the communication device 204a. In the above-mentioned scenario, where the communication network 206 is embodied in the PSTN, the automatic participation verification entity 112 can examine the SS7 signalling information, the Basic Rate Interface (BRI) or the Primary Rate Interface (PRI), in order to retrieve the telephone number associated with the communication device 204a.

In an alternative non-limiting embodiment of the present invention, which is particularly true when the call from the communication device 204a has been connected via the multi-party call handling entity 110, the automatic participant verification entity 112 can examine signalling information or other data associated with the connection from the multi-party call entity 110 or, alternatively, the automatic participant verification entity 112 can receive an indication of the user identifier from the multi-party call entity 110.

In an alternative non-limiting embodiment of the present invention, the CLID information may be incomplete. For example, the CLID information may be misleading, for example when a call is originated from a PBX system (ex. all calls may appear to be originated from a single "central" number, etc.). Accordingly, in some non-limiting embodiments, the automatic participant verification entity 112 can be operable to obtain the termination identifier (or a so-called "termination name") or another missing piece of the CLID information by accessing an auxiliary source of termination identifiers (for example, a LIDB database or the like), as is known to those of skill in the art.

In an alternative embodiment of the present invention, the automatic participant verification entity 112 can interrogate the communication device 204a and request the communication device 204a to provide its termination identifier, which can comprise an IP address, a telephone number, a SIP address or any other suitable termination identifier associated with the communication device 204a (such as, but not limited to, a MAC address and the like).

In an alternative non-limiting embodiment of the present invention, another type of user identifier can be used, such as, but not limited to, an account number, a user number, an employee number, a proprietary identifier, a password, a name or a combination thereof. In this alternative non-limiting embodiment of the present invention, the automatic participant verification entity 112 can obtain the user identifier from the user 102a. In a first specific non-limiting example, the user 102a can key in the indication of the user identifier using a keypad of the communication device 204a. In a second specific non-limiting example, the user 102a can produce a speech utterance representative of the user identifier and the automatic participant verification entity 112 can capture the user identifier by applying speech recognition techniques known to those of skill in the art.

Yet in alternative non-limiting embodiments, the user identifier obtained by the automatic verification entity 112 may not be compatible with the allowed participant identifiers associated with the allowed multi-party call participants maintained by the scheduling server 108'. In these embodiments, the automatic participant verification entity 112 can transmit a query to the auxiliary data source 109' (or another data source) to obtain an auxiliary user identifier associated with the user 102a. For example, the user identifier obtained by the automatic participant verification entity 112 may comprise a termination identifier associated with the communication device 204a, while the one or more identifiers associated with at least one allowed multi-party call participant stored by the scheduling server 108' may comprise the respective e-mail address. Accordingly, the automatic participant verification entity 112 can transmit a request containing the termination identifier associated with the communication device 204a to the auxiliary data source 109' to obtain an e-mail address (or any other suitable user identifier) corresponding to the termination identifier associated with the communication device 204a. Alternatively, the automatic participant verification entity 112 can transmit the user identifier to the scheduling server 108' and the scheduling server 108' can perform the appropriate translation by accessing the auxiliary data source 109'.

Step 320

Next, at step 320, the automatic participant verification entity 112 becomes aware of at least one allowed participant identifier associated with at least one allowed participant for the multi-party call.

More specifically, the automatic participant verification entity 112 can access the scheduling server 108' in an attempt to retrieve the at least one allowed participant identifier associated with the at least one allowed multi-party call participant. In a specific non-limiting embodiment of the present invention, the automatic participant verification entity 112 generates a request in accordance with a specific communication protocol shared by the scheduling server 108' and the automatic participant verification entity 112. In a non-limiting example, the request is generated in accordance with the "iCal" protocol. It should be noted that any other suitable protocol can be used.

The request can include the indication of the user identifier associated with the multi-party call organizer (i.e. the user 102b in the example being described herein) to enable the scheduling server 108' to retrieve scheduling data associated with the user 102b. How the automatic participant verification entity 112 generates the request containing the indication of the user identifier associated with the user 102b depends on the type of the indication of the specific multi-party call that the user 102a wishes to access, which was obtained as part of step 310.

The Indication of the Specific Multi-Party Call Contains the Termination Identifier Associated with the Communication Device Associated with the Multi-Party Call Organizer:

It will be recalled that in some non-limiting embodiments, the indication of the multi-party call that the user 102a wishes to join can comprise the termination identifier associated with the communication device 204b (i.e. the termination identifier associated with the communication device employed by the multi-party call organizer). In these embodiments, the automatic participant verification entity 112 can generate the request containing the termination identifier (or another type of user identifier that is linked to the termination identifier) associated with the communication device 204b to enable the scheduling server 108' to retrieve scheduling data associated with the user 102b based on the termination identifier associated with the communication device 204b.

The Indication of the Specific Multi-Party Call Contains the Multi-Party Call Dial-in Number or the Multi-Party Call Identifier:

In other non-limiting embodiments, where the indication of the specific multi-party call that the user 102a wishes to join comprises the multi-party call identifier or the multi-party call dial-in number, the automatic participant verification entity 112 first determines a user identifier associated with the multi-party call organizer.

In some non-limiting embodiments of the present invention, the automatic participant verification entity 112 can transmit a request to the multi-party call entity 110 to obtain the user identifier that corresponds to the multi-party call identifier (or the multi-party call dial-in number) that is associated with the multi-party call that the user 102a wishes to join. The multi-party call entity 110 can access a database (not depicted) mapping multi-party call identifiers to respective user identifiers associated with respective multi-party call organizers to whom the multi-party call bridge having the respective multi-party call identifier belongs. Based on the multi-party call identifier (or the multi-party call dial-in identifier), the multi-party call entity 110 can retrieve the corresponding user identifier and can transmit the so-retrieved user identifier to the automatic participant verification entity 112. In an alternative non-limiting embodiment of the present invention, the automatic participant verification entity 112 can maintain a similar database or, alternatively, access a similar database directly and perform the look up without going through the multi-party call entity 110. In yet another non-limiting embodiment of the present invention, the scheduling server 108' could perform the look-up.

Naturally, any other suitable type of a user identifier associated with the multi-party call organizer can be used.

Next, irrespective of how the automatic participant verification entity 112 generates the request destined to the scheduling server 108', the automatic participant verification entity 112 transmits the request to the scheduling server 108'. How the automatic participant verification entity 112 transmits the request to the scheduling server 108' will naturally depend on the type of connection therebetween. For example, in the above-described non-limiting architecture of FIG. 2A, the request can be transmitted via the connection "A". In the above-described non-limiting architecture of FIG. 2D, the request can be transmitted via the data network 230. Many other alternatives are also possible.

Responsive to the receipt of the request, the scheduling server 108' retrieves scheduling data associated with the user 102b based on the user identifier associated with the user 102b (i.e. the multi-party call organizer) received within the request from the automatic participant verification entity 112. Once the scheduling server 108' retrieves scheduling data associated with the user 102b, the scheduling server 108' examines the scheduling data in an attempt to locate a scheduling event which is associated with the time when the scheduling server 108' received the request or, put another way, associated with the time when the user 102a indicated the desire to join the multi-party call.

In an alternative non-limiting embodiment of the present invention, the scheduling server 108' can attempt to locate a scheduling event which is to commence within a pre-defined time interval from the time when the scheduling server 108' received the request. In a specific non-limiting example, the scheduling server 108' attempts to locate a scheduling event which is to commence within 15 minutes from the time when the request was received. In an alternative non-limiting embodiment, any suitable time interval (such as 1 minute, 5 minutes, 10 minutes, 30 minutes and the like) before or after the time the request was received can be used. In another non-limiting embodiment of the present invention, the scheduling server 108' can further attempt to locate a scheduling event which is "in progress" at the time when the request was received.

In some non-limiting embodiments of the present invention, the scheduling server 108' can perform these checks in series. For example, the scheduling server 108' can first attempt to locate a scheduling event that is to commence at a time when the request is received. If it fails to locate such a scheduling event, it may attempt to locate a scheduling event which is in progress or which is to commence within a pre-determined time interval. Naturally other arrangements are possible and it should be explicitly understood that these attempts can be executed in parallel and/or independent of each other. It should be further understood that in some non-limiting embodiments of the present invention, some of these checks can be omitted.

If the scheduling server 108' fails to locate the appropriate scheduling event or if the scheduling server 108' fails to locate scheduling data associated with the user 102b, the scheduling server 108' can execute an exception handling routine, such as, but not limited to, releasing an error message to the automatic participant verification entity 112.

If, on the other hand, the scheduling server 108' locates the appropriate scheduling event, it releases scheduling data associated with the scheduling event to the automatic participant verification entity 112, in this specific non-limiting example using the iCal protocol. Naturally, the scheduling server 108' can release other data maintained within the scheduling event, such as, but not limited to the multi-party call parameter and the like.

In an alternative non-limiting embodiment of the present invention, the scheduling server 108' can send the scheduling data (or a subset thereof, such as, for example, a subset associated with the current day) associated with the user 102b using the user identifier associated with the user 102b to the communication session handling entity 112 and the communication session handling entity 112 can perform the look up for the specific scheduling event, as was described above.

Therefore, the automatic participant verification entity 112 becomes aware of the at least one identifier associated with at least one allowed multi-party call participant.

Alternative Enhancements

In some non-limiting embodiments of the present invention, the scheduling data received from the scheduling server 108' may have incomplete data associated with the allowed participant identifier(s) associated with the allowed multi-party call participant(s). For example, the allowed participant identifier(s) may only contain first and last names associated with the one or more allowed multi-party call participant(s), but no other user identifiers (for example, no termination identifiers associated with the communication devices that can be potentially employed by the allowed multi-party call participants to join the multi-party call). Alternatively, the allowed participant identifier(s) may contain only a limited number of user identifiers (ex. a name and an e-mail address) associated with each of the allowed multi-party call participants. Therefore, in some non-limiting embodiments of the present invention, the automatic participant verification entity 112 can access an additional source of contact data to obtain a complete set of allowed participant identifiers associated with the allowed multi-party call participants.

Specifically, in some non-limiting embodiments of the present invention, the automatic participant verification entity 112 can access the auxiliary data source 109' (or another data source) in an attempt to retrieve at least one auxiliary allowed participant identifier associated with the at least one allowed participant for the multi-party call. Consider the following example as a non-limiting illustration for this optional enhancement. Assume that the scheduling data maintained by the scheduling server 108' in association with the user 102b contains a scheduling event associated with the upcoming multi-party call. The scheduling event, among other information, contains the following contact data about one of the allowed multi-party call participants, expressed as a non-limiting example in XML:

<ParticipantName><John Doe<E-mail><john.doe@server.com>

The automatic participant verification entity 112 can transmit a query to the auxiliary data source 109', which in this non-limiting example may comprise a corporate directory, to request one or more auxiliary allowed participant identifiers (as well as other contact data maintained thereat) associated with John Doe (who in this example represents an allowed participant for the multi-party call organized by the user 102b). In the non-limiting example being presented herein, the auxiliary data source 109' can return the following contact data to the automatic participation validation entity 112:

---
<ParticipantName><John Doe>
<OfficeTelephone><111-222-3333>
<Cellular><222-333-4444>
<Home><333-444-5555>
<AlternativeTelephone><444-555-6666>
<E-mail><john.doe@server.com>
---

It should be noted that the automatic participant verification entity 112 can access one or more additional data sources (not depicted) in an attempt to retrieve additional auxiliary user identifiers associated with the user 104a. It should be further noted that in alternative non-limiting embodiments of the present invention, the scheduling server 108' can access the auxiliary data source 109' or one or more additional data sources in an attempt to retrieve additional auxiliary user identifiers associated with the user 102a.

It should be now clear that by accessing the scheduling server 108', optionally accessing the auxiliary data source 109' and optionally accessing additional data source(s), the automatic participant verification entity 112 becomes aware of one or more allowed participant identifiers associated with at least one allowed multi-party call participant. In some non-limiting embodiments of the present invention, the at least one allowed participant identifier associated with the at least one allowed multi-party call participant can be indicative of the termination identifiers associated with the respective communication device(s) from which at least one allowed multi-party call participant may join the multi-party call. Alternatively, the identifiers associated with the at least one allowed multi-party call participant can comprise other types of user identifiers, such as, but not limited to, an employee number, an account number, a user name, a password, a name, a proprietary identifier and the like.

The interaction between the automatic participant verification entity 112 and the auxiliary data source 109' can be implemented in substantially the same manner as the interaction between the automatic participant verification entity 112 and the scheduling server 108'.

Step 330

At this step, the automatic participant verification entity 112 compares the user identifier with at least one identifier associated with the at least one allowed multi-party call participant obtained at step 320. It should be noted that in an alternative non-limiting embodiment of the present invention, the automatic participant verification entity 112 can further compare the auxiliary user identifier with at least one allowed participant identifier associated with the at least one allowed multi-party call participant obtained at step 320. Alternatively, the automatic participant verification entity 112 can further compare the user identifier with the at least one auxiliary allowed participant identifier associated with at least one allowed multi-party call participant. Effectively, the comparison can be done on the user identifier (or a translated user identifier) with at least one allowed participant identifier (or a translated at least one allowed participant identifier).

In an alternative non-limiting embodiment of the present invention, the comparison can be performed by the scheduling server 108'. In this non-limiting embodiment of the present invention, the scheduling server 108' can receive an indication of the user identifier of the user who has indicated the user's desire to join the multi-party call, an indication of the user identifier associated with the multi-party call organizer and to perform a look up and/or the comparison. In this non-limiting embodiment of the present invention, the scheduling server 108' can transmit a response, the response being indicative of whether the user 102a is an allowed multi-party call participant.

Step 340a:

If the user identifier associated with the user 102a does not match the at least one allowed participant identifier associated with the at least one allowed multi-party call participant (i.e. the "NO" branch of step 330"), the automatic participant verification entity 112 can execute an exception handling routine at step 340a.

For example, the automatic participant verification entity 112 can determine that the user 102a who employs the communication device 204a to join the multi-party call is not an allowed multi-party call participant and play to the user 102a an appropriate error message.

In an alternative non-limiting embodiment of the present invention, which can be particularly useful in a scenario where the user 102a has indicated the user's desire to join the multi-party call by dialling the termination identifier associated with the user 102b, the automatic participant verification entity 112 may determine, based on the determination that the user 102a employing the communication device 204a is not an allowed multi-party call participant, that the user 102a employing the communication device 104 was not in fact desirous of joining the multi-party call, but was rather desirous of calling the user 102b directly. In this non-limiting scenario, the automatic participant verification entity 112 may "release" the call from the communication device 204a back to the network element 206a in order for the network element 206a to connect the call from the communication device 204a to the communication device 204b. In an alternative non-limiting embodiment, the automatic participant verification entity 112 may forward the received call to the communication device 204b. In an alternative non-limiting embodiment of the present invention, the network element 206a (or the automatic participant verification entity 112) can detect that the communication device 204b is busy (i.e. that the user 102b uses the communication device 204b for the multi-party call), the network element 206a (or the automatic participant verification entity 112) can forward the call from the communication device 204a to a voicemail system associated with the user 102b.

Step 340b:

If, on the other hand, the user identifier associated with the user 102a matches the at least one allowed participant identifier associated with the at least one allowed multi-party call participant (i.e. the "YES" branch of step 330), the automatic participant verification entity 112 can proceed to step 340b.

For the purposes of the forthcoming discussion, it is assumed that it has been determined at step 330 that the user identifier associated with the user 102a matches the at least one allowed participant identifier associated with the at least one allowed multi-party call participant and, therefore, the automatic participant verification entity 112 executes step 340b.

At step 340b, the automatic participant verification entity 112 causes the communication device 204a to join the multi-party call. In a non-limiting scenario, where the user 102a has indicated the user's desire to join the multi-party call by dialling the termination identifier associated with the user 102b, the automatic participant verification entity 112 can cause the network element 206a to forward the call from the communication device 204a to the multi-party call entity 110. When the multi-party call entity 110 receives an incoming call from the communication device 204a originally "destined" to the communication device 204b (i.e. having the termination identifier of the communication device 204b as the originally dialled destination), the multi-party call entity 110 is operable to access a database (not depicted) to determine which multi-party call is associated with the user 102b of the communication device 204b, based on the termination identifier associated with the communication device 204b. Such a system is known to those of skill in the art and an example of such a system is disclosed in a European Patent application entitles "CALL-ME MULTI-PARTY CALL SYSTEM" filed on Aug. 21, 2000 and which bears a publication number EP 1 81 932 A2, content of which is incorporated herein by reference in its entirety. It should be noted that any alternative multi-party call entity 110 can be used.

In another non-limiting embodiment, which can be particularly useful in a scenario where the user 102a has indicated the user's desire to join the multi-party call by dialling the multi-party call dial-in number, the automatic participant verification entity 112 causes the network element 206a to route the call from the communication device 204a to the multi-party call entity 110, using the originally dialled multi-party call dial-in number.

In some embodiments of the present invention, the network element 206a can create a three-way call between the communication device 204a, the automatic participant validation entity 112 and the multi-party call entity 110.

In these embodiments, the automatic participant verification entity 112 can interact with the multi-party call entity 110 in order, for example, to provide to the multi-party call entity 110 the multi-party call identifier, which can be conveniently retrieved from the scheduling server 108' as part of step 320 described above. Details of such a system for connection to a multi-party call bridge using scheduling data are described in a patent application assigned to the Applicant, entitled "METHOD, SYSTEM AND APPARATUS FOR HANDLING ESTABLISHMENT OF A COMMUNICATION SESSION" by Arsenault et al. and having an for which the filing date and the filing serial number are not yet available; the content of which is incorporated herein by reference in its entirety. Alternatively, rather then establishing a three-way call, the automatic participant verification entity 112 can establish a communication session with the multi-party call entity 110 using the multi-party call dial-in number retrieved from the scheduling data, provide to the multi-party call entity 110 a multi-party call identifier retrieved from scheduling data (if required) and to bridge the call from the communication device 204a to the call established with the multi-party call entity 110.

In another non-limiting embodiment of the present invention, which is particularly true in a scenario where the indication of the user's desire to join the multi-party call is received at the multi-party call entity 110 and the multi-party call entity 110 transmits a query to the automatic participant validation entity 112, the automatic participant validation entity 112 can transmit an appropriate trigger to the multi-party call entity 110 to denote whether a particular user is an allowed multi-party call participant or not. The multi-party call entity 110 can then execute an appropriate routine based on the received trigger, either allow or not allow the user 102a to join the multi-party call.

It should be noted that the method described above can be adapted and changed to suit alternative implementations without departing from the teachings of embodiments of the present invention.

Optional Over-Ride Function:

For example, in some non-limiting embodiments of the present invention, a so-called user over-ride function can be executed. More specifically, recall that at step 330 described above, the automatic participant verification entity 112 may determine that the user identifier (or the auxiliary user identifier) associated with the user 102a does not match the at least one allowed participant identifier (or an auxiliary allowed participant identifier) associated with the at least one allowed multi-party call participant.

In this non-limiting scenario (i.e. the "NO" branch of step 330), the automatic participant validation entity 112 may execute the optional over-ride function. More specifically, the automatic participant validation entity 112 may interact with the user 102a to request an indication of an overriding user identifier, such as, but not limited to, an office telephone number, an employee number, an account number, an overriding password or any other suitable type of the overriding identifier. In a first specific non-limiting example, the user 102a can key in the indication of the overriding user identifier using a keypad of the communication device 204a. In a second specific non-limiting example, the user 102a can produce a speech utterance representative of the overriding user identifier and the automatic participant verification entity 112 can capture the overriding user identifier by applying speech recognition techniques known to those of skill in the art. In yet another alternative non-limiting embodiment of the present invention, the automatic participant verification entity 112 can capture a speech utterance produced by the user 102a and by applying known speech recognition techniques can become aware of a voice pattern associated with the user 102a. The automatic participant verification entity 112 can then access a database (not depicted) that matches voice patterns to respective user overriding identifiers.

The automatic participant verification entity 112 can then compare the overriding user identifier with the at least one allowed participant identifier associated with the at least one allowed multi-party call participant and, if the match is determined, execute step 340b described above.

Those skilled in the art will appreciate that certain functionality of the automatic participant verification entity 112, the scheduling server 108', the auxiliary data source 109 and/or other elements of the infrastructure described herein may be implemented as pre-programmed hardware or firmware elements (e.g., application specific integrated circuits (ASICs), electrically erasable programmable read-only memories (EEPROMs), etc.), or other related components. In other embodiments, certain portions of the automatic participant verification entity 112, the scheduling server 108', the auxiliary data source 109 and/or other elements may be implemented as an arithmetic and logic unit (ALU) having access to a code memory (not shown) which stores program instructions for the operation of the ALU. The program instructions could be stored on a medium which is fixed, tangible and readable directly by the automatic participant verification entity 112, the scheduling server 108', the auxiliary data source 109 and/or other elements, (e.g., removable diskette, CD-ROM, ROM, fixed disk, USB drive), or the program instructions could be stored remotely but transmittable to the automatic participant verification entity 112, the scheduling server 108', the auxiliary data source 109 and/or other elements via a modem or other interface device.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

What is claimed is:

1. A method for verifying a participant in a multi-party call environment, the method comprising:
    receiving a call from a first communication device destined for a second communication device associated with a multi-party call organizer via a communication network;
    determining a termination identifier used to identify the first communication device within the communication network;
    accessing scheduling data associated with the multi-party call organizer, the scheduling data comprising at least one scheduling event associated with a multi-party call that includes at least one allowed participant identifier associated with at least one allowed participant for the multi-party call;
    determining if the scheduling event associated with the multi-party call is associated with a time the call from the first communication device is received;
    if the scheduling event is associated with the time the call is received, comparing the termination identifier used to identify the first communication device with the at least one allowed participant identifier associated with the at least one allowed participant for the multi-party call; and
    responsive to said comparing rendering a positive outcome, causing the first communication device to join the multi-party call.

2. The method defined in claim 1, wherein said receiving the call from the first communication device is in response to a user of the first communication device performing one of:
    selecting a link;
    clicking a button;
    keying in a short code.

3. The method defined in claim 1, wherein said determining a termination identifier used to identify the first communication device within the communication network comprises examining signalling information used for initiating the call by the first communication device.

4. The method defined in claim 1, wherein said determining a termination identifier used to identify the first communication device within the communication network comprises requesting the first communication device to provide an indication of the termination identifier.

5. The method defined in claim 1, further comprising determining a user identifier associated with the multi-party call organizer; and wherein said accessing scheduling data associated with the multi-party call organizer comprises transmitting a request to a memory for storing said scheduling data; said request comprising the user identifier associated with the multi-party call organizer.

6. The method defined in claim 5, wherein said determining the user identifier associated with the multi-party call organizer comprises: retrieving a termination identifier associated with the second communication device associated with the multi-party call organizer from signalling information associated with the call.

7. The method defined in claim 5, wherein said second communication device associated with the multi-party call organizer comprises a multi-party call handling entity; and wherein said determining the user identifier associated with the multi-party call organizer comprises:
    obtaining a multi-party call identifier; and
    determining the user identifier associated with the multi-party call organizer based upon the multi-party call identifier.

8. The method defined in claim 5, further comprising generating said request according to a communication protocol.

9. The method defined in claim 8, wherein said memory comprises a scheduling server; and wherein said communication protocol comprises "iCal" protocol.

10. The method defined in claim 5, wherein said memory is for maintaining the scheduling data for at least the multi-party call organizer; and wherein said transmitting a request is instrumental in causing said memory to:
    access scheduling data associated with the multi-party call organizer;
    locate the scheduling event associated with the multi-party call within the scheduling data associated with the multi-party call organizer;
    release the at least one allowed participant identifier associated with the at least one allowed participant for the multi-party call maintained within the scheduling event.

11. The method defined in claim 1, wherein said determining if the scheduling event associated with the multi-party call is associated with the time the call is received from the first communication device comprises:
    determining if the scheduling event associated with the multi-party call is to commence at a time the call from the first communication device is received.

12. The method defined in claim 1, wherein said determining if the scheduling event associated with the multi-party call is associated with the time the call is received from the first communication device comprises:
  determining if the scheduling event associated with the multi-party call is to commence at a time which is within a predetermined interval from the time when the call from the first communication device is received.

13. The method defined in claim 1, wherein said determining if the scheduling event associated with the multi-party call is associated with the time the call is received from the first communication device comprises:
  determining if the scheduling event associated with the multi-party call is in progress at a time when the call from the first communication device is received.

14. The method defined in claim 1, wherein said determining if the scheduling event associated with the multi-party call is associated with the time the call is received from the first communication device comprises at least one of:
  determining if the scheduling event associated with the multi-party call is to commence at a time the call from the first communication device is received;
  determining if the scheduling event associated with the multi-party call is to commence at a time which is within a predetermined interval from the time when the call from the first communication device is received;
  determining if the scheduling event associated with the multi-party call is in progress at a time when the call from the first communication device is received.

15. The method defined in claim 5, wherein said request further comprises the termination identifier used to identify the first communication device; and wherein said transmitting a request is instrumental in causing said memory to:
  retrieve the at least one allowed participant identifier associated with the at least one allowed participant for the multi-party call from the scheduling data associated with the multi-party call organizer based on the user identifier associated with the multi-party call organizer; and wherein said comparing comprises the memory:
  comparing the termination identifier used to identify the first communication device with the at least one allowed participant identifier associated with the at least one allowed participant for the multi-party call; and
  releasing a response signal, the response signal indicative of whether the termination identifier used to identify the first communication device matches the at least one allowed participant identifier associated with the at least one allowed participant for the multi-party call.

16. The method defined in claim 1, wherein said comparing comprises:
  accessing an auxiliary data source to determine at least one auxiliary allowed participant identifier associated with the at least one allowed participant for the multi-party call based on the at least one allowed participant identifier;
  comparing the at least one auxiliary allowed participant identifier with the termination identifier used to identify the first communication device; and wherein said causing comprises:
  causing the first communication device to join the multi-party call if the at least one auxiliary allowed participant identifier matches the termination identifier used to identify the first communication device.

17. The method defined in claim 16, wherein said at least one auxiliary allowed participant identifier comprises at least one termination identifier associated with at least one auxiliary communication device associated with the at least one allowed multi-party call participant.

18. The method defined in claim 1, wherein said comparing comprises:
  accessing an auxiliary data source to determine an auxiliary identifier based on the termination identifier used to identify the first communication device;
  comparing the auxiliary identifier with the at least one allowed participant identifier associated with the at least one allowed participant for the multi-party call; and wherein said causing comprises:
  causing the first communication device to join the multi-party call if the auxiliary identifier matches the at least one allowed participant identifier associated with the at least one allowed participant for the multi-party call.

19. The method defined in claim 18, wherein said auxiliary identifier comprises a termination identifier associated with an auxiliary communication device associated with a user of the first communication device.

20. The method defined in claim 1, further comprising, responsive to said comparing rendering a negative outcome:
  obtaining from a user of the first communication device an indication of an overriding user identifier;
  comparing the overriding user identifier with the at least one allowed participant identifier associated with the at least one allowed participant for the multi-party call; and
  responsive to said comparing the overriding user identifier with the at least one allowed participant identifier associated with the at least one allowed participant for the multi-party call rendering a positive outcome, causing the first communication device to join the multi-party call.

21. The method defined in claim 20, wherein said obtaining comprises receiving from the user of the first communication device at least one DTMF signal, the at least one DTMF signal being indicative of the overriding user identifier.

22. The method defined in claim 20, wherein said obtaining comprises receiving from the user of the first communication device a speech utterance, the speech utterance being indicative of the overriding user identifier.

23. The method defined in claim 1, further comprising:
  responsive to said comparing rendering a negative outcome, causing the first communication device to be connected to one of the second communication device associated with the multi-party call organizer and a voice mail system associated with the multi-party call organizer.

24. A system for verifying a participant in a multi-party call environment, the system comprising:
  an application server operable to:
    receive a call from a first communication device destined for a second communication device associated with a multi-party call organizer via a communication network;
    determine a termination identifier used to identify the first communication device within the communication network;
    access scheduling data associated with the multi-party call organizer, the scheduling data comprising at least one scheduling event associated with a multi-party call that includes at least one allowed participant identifier associated with at least one allowed participant for the multi-party call;
    determine if the scheduling event associated with the multi-party call is associated with a time the call from the first communication device is received;

if the scheduling event is associated with the time the call is received, compare the termination identifier used to identify the first communication device with the at least one allowed participant identifier associated with the at least one allowed participant for the multi-party call; and cause the first communication device to join the multi-party call if the termination identifier used to identify the first communication device matches the at least one allowed participant identifier associated with the at least one allowed participant for the multi-party call.

25. The system defined in claim 24, wherein the second communication device associated with the multi-party call organizer comprises a communication device used by the multi-party call organizer to receive telephonic calls; and wherein the call is forwarded to the application server by a network element associated with the communication network.

26. The system defined in claim 24, wherein the second communication device associated with the multi-party call organizer comprises a multi-party call handling entity; and wherein the call is forwarded to the application server by a network element associated with the communication network.

27. The system defined in claim 24, wherein the second communication device associated with the multi-party call organizer comprises a multi-party call handling entity; and wherein the call is forwarded to the application server by the multi-party call handling entity.

28. The system defined in claim 24, further comprising the first and second communication devices, the second communication device comprising a multi-party call handling entity; and wherein the first communication device is operable to establish a call via the communication network to the multi-party call handling entity; and wherein the multi-party call entity is operable to redirect the call to the application server.

29. The system defined in claim 24, further comprising a multi-party call handling entity and the first communication device; wherein the first communication device is operable to attempt to establish a call via the communication network to the second communication device associated with the multi-party call organizer; and wherein the multi-party call handling entity is operable to receive the call that the first communication device attempts to establish to the second communication device associated with the multi-party call organizer from a network element associated with the communication network and to redirect the call to the application server.

30. The system defined in claim 24, wherein to determine a termination identifier used to identify the first communication device within the communication network, the application server is operable to examine signalling information used for establishing the call by the first communication device.

31. The system defined in claim 24, wherein to determine a termination identifier used to identify the first communication device within the communication network, the application server is operable to request the first communication device to provide an indication of the termination identifier.

32. The system defined in claim 24, wherein to determine a termination identifier used to identify the first communication device within the communication network, the application server is operable to receive an indication of the termination identifier from at least one of:
    a network element associated with the communication network;
    a multi-party call handling entity associated with the multi-party call.

33. The system defined in claim 24, wherein the application server is further operable to determine a user identifier associated with the multi-party call organizer; wherein to access scheduling data associated with the multi-party call organizer, the application server is operable to transmit a request to a memory for storing the scheduling data, said request comprising the user identifier associated with the multi-party call organizer.

34. The system defined in claim 33, further comprising the memory for storing the scheduling data, wherein the memory is operable to retrieve the at least one allowed participant identifier associated with the at least one allowed participant for the multi-party call based on the received request.

35. The system defined in claim 33, wherein to determine the user identifier associated with the multi-party call organizer, the application server is operable to retrieve a termination identifier associated with the second communication device associated with the multi-party call organizer from signalling information associated with the call received from the first communication device.

36. The system defined in claim 33, wherein to determine the user identifier associated with the multi-party call organizer, the application server is operable to:
    obtain a multi-party call identifier; and
    determine the user identifier associated with the multi-party call organizer based upon the multi-party call identifier.

37. The system defined in claim 33, wherein to determine the user identifier associated with the multi-party call organizer, the application server is operable to:
    receive an indication of the user identifier associated with the multi-party call organizer from a multi-party call handling entity associated with the multi-party call.

38. The system defined in claim 33, wherein the application server is further operable to generate said request according to a communication protocol.

39. The system defined in claim 38, wherein said memory comprises a scheduling server; and wherein said communication protocol comprises "iCal" protocol.

40. The system defined in claim 33, further comprising the memory for storing the scheduling data, wherein said memory is operable to maintain the scheduling data for at least the multi-party call organizer; and wherein said request is instrumental in causing the memory to:
    access scheduling data associated with the multi-party call organizer;
    locate the scheduling event associated with the multi-party call within the scheduling data associated with the multi-party call organizer; and
    release the at least one allowed participant identifier maintained within the scheduling event.

41. The system defined in claim 24, wherein to determine if the scheduling event associated with the multi-party call is associated with the time the call is received from the first communication device, the application server is operable to:
    determine if the scheduling event associated with the multi-party call is to commence at a time when the call from the first communication device is received.

42. The system defined in claim 24, wherein to determine if the scheduling event associated with the multi-party call is associated with the time the call is received from the first communication device, the application server is operable to:
    determine if the scheduling event associated with the multi-party call is to commence at a time which is within a predetermined interval from the time when the call from the first communication device is received.

43. The system defined in claim 24, wherein to determine if the scheduling event associated with the multi-party call is associated with the time the call is received from the first communication device, the application server is operable to:
   determine if the scheduling event associated with the multi-party call is in progress at a time when the call from the first communication device is received.

44. The system defined in claim 24, wherein to compare the termination identifier used to identify the first communication device with the at least one allowed participant identifier associated with the at least one allowed participant for the multi-party call, the application server is operable to:
   access an auxiliary data source to determine at least one auxiliary allowed participant identifier associated with the at least one allowed participant for the multi-party call based on the at least one allowed participant identifier;
   compare the at least one auxiliary allowed participant identifier with the termination identifier used to identify the first communication device; and
   wherein to cause the first communication device to join the multi-party call, the application server is operable to cause the first communication device to join the multi-party call if the at least one auxiliary allowed participant identifier matches the termination identifier used to identify the first communication device.

45. The system defined in claim 44, wherein said at least one auxiliary allowed participant identifier comprises at least one termination identifier associated with at least one auxiliary communication device associated with the at least one allowed multi-party call participant.

46. The system defined in claim 24, the system further comprising a memory for storing the scheduling data; and wherein to compare the termination identifier used to identify the first communication device with the at least one allowed participant identifier associated with the at least one allowed participant for the multi-party call, the application server is operable to:
   transmit a request to the memory; the request comprising the termination identifier used to identify the first communication device;
   wherein responsive to the request, the memory is operable to:
   compare the termination identifier used to identify the first communication device with the at least one allowed participant identifier associated with the at least one allowed participant for the multi-party call; and
   transmit a response to the application server, the response comprising an indication of whether the termination identifier used to identify the first communication device matches the at least one allowed participant identifier associated with the at least one allowed participant for the multi-party call.

47. The system defined in claim 24, the system further comprising a memory for storing the scheduling data; and wherein to compare the termination identifier used to identify the first communication device with the at least one allowed participant identifier associated with the at least one allowed participant for the multi-party call, the application server is operable to:
   transmit a request to the memory; the request comprising the termination identifier used to identify the first communication device;
   wherein responsive to the request, the memory is operable to:
   access an auxiliary data source to determine at least one auxiliary allowed participant identifier associated with the at least one allowed participant for the multi-party call based on the at least one allowed participant identifier;
   compare the at least one auxiliary allowed participant identifier with the termination identifier used to identify the first communication device; and
   transmit a response to the application server, the response comprising an indication of whether the termination identifier used to identify the first communication device matches the at least one auxiliary allowed participant identifier.

48. The system defined in claim 24, wherein to compare the termination identifier used to identify the first communication device with the at least one allowed participant identifier associated with the at least one allowed participant for the multi-party call, the application server is operable to:
   access an auxiliary data source to determine an auxiliary identifier based on the termination identifier used to identify the first communication device;
   compare the auxiliary identifier with the at least one allowed participant identifier associated with the at least one allowed participant for the multi-party call; and
   wherein to cause the first communication device to join the multi-party call, the application server is operable to:
   cause the first communication device to join the multi-party call if the auxiliary identifier matches the at least one allowed participant identifier associated with the at least one allowed participant for the multi-party call.

49. The system defined in claim 48, wherein said auxiliary identifier comprises a termination identifier associated with an auxiliary communication device associated with a user of the first communication device.

50. The system defined in claim 24, the system further comprising a memory for storing the scheduling data; and wherein to compare the termination identifier used to identify the first communication device with the at least one allowed participant identifier associated with the at least one allowed participant for the multi-party call, the application server is further operable to:
   transmit a request to the memory; the request comprising the termination identifier used to identify the first communication device;
   wherein responsive to the request, the memory is operable to:
   access an auxiliary data source to determine an auxiliary identifier based on the termination identifier used to identify the first communication device;
   compare the auxiliary identifier with the at least one allowed participant identifier associated with the at least one allowed participant for the multi-party call; and
   transmit a response to the application server, the response comprising an indication of whether the auxiliary identifier matches the at least one allowed participant identifier associated with the at least one allowed participant for the multi-party call.

51. The system defined in claim 24, wherein the application server is further operable, if the termination identifier used to identify the first communication device does not match the at least one allowed participant identifier associated with the at least one allowed participant for the multi-party call, to:
   obtain from a user of the first communication device an indication of an overriding user identifier;
   compare the overriding user identifier with the at least one allowed participant identifier associated with the at least one allowed participant for the multi-party call; and
   cause the first communication device to join the multi-party call if the overriding user identifier matches the at least one allowed participant identifier associated with the at least one allowed participant for the multi-party call.

52. The system defined in claim 51, wherein to obtain from the user of the first communication device an indication of an overriding user identifier, the application server is operable to receive from the user at least one DTMF signal, the at least one DTMF signal being indicative of the overriding user identifier.

53. The system defined in claim 51, wherein to obtain from the user of the first communication device an indication of an overriding user identifier, the application server is operable to receive from the user a speech utterance, the speech utterance being indicative of the overriding user identifier.

54. The system defined in claim 24, wherein the application server is further operable to:
   prevent the communication device from joining the multi-party call if the termination identifier used to identify the communication device does not match the at least one allowed participant identifier associated with the at least one allowed participant for the multi-party call.

55. The system defined in claim 24, wherein responsive to the termination identifier used to identify the first communication device not matching the at least one allowed participant identifier associated with the at least one allowed participant for the multi-party call, the application server is further operable to:
   cause the first communication device to be connected to one of the second communication device associated with the multi-party call organizer and a voice mail system associated with the multi-party call organizer.

56. An apparatus for verifying a participant in a multi-party call environment, the apparatus comprising:
   means for receiving a call from a first communication device destined for a second communication device associated with a multi-party call organizer via a communication network;
   means for determining a termination identifier used to identify the first communication device within the communication network;
   means for accessing scheduling data associated with the multi-party call organizer, the scheduling data comprising at least one scheduling event associated with a multi-party call that includes at least one allowed participant identifier associated with at least one allowed participant for the multi-party call;
   means for determining if the scheduling event associated with the multi-party call is associated with a time the call from the first communication device is received;
   means for comparing the termination identifier used to identify the first communication device with the at least one allowed participant identifier associated with the at least one allowed participant for a multi-party call; and
   means for causing the first communication device to join the multi-party call if said means for comparing renders a positive outcome.

* * * * *